US008681349B2

(12) United States Patent  (10) Patent No.: US 8,681,349 B2
Tanaka et al.  (45) Date of Patent: Mar. 25, 2014

(54) IMAGE PROCESSING APPARATUS AND IMAGE PROCESSING METHOD FOR EXECUTING A JOB REQUIRING AN APPROVAL OF IMAGE OUTPUT

(75) Inventors: Kazuto Tanaka, Ichikawa (JP); Yasuaki Sugimoto, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 223 days.

(21) Appl. No.: 13/207,821

(22) Filed: Aug. 11, 2011

(65) Prior Publication Data

US 2012/0038950 A1 Feb. 16, 2012

(30) Foreign Application Priority Data

Aug. 16, 2010 (JP) ................................. 2010-181864
Nov. 16, 2010 (JP) ................................. 2010-256260

(51) Int. Cl.
*G06K 15/00* (2006.01)

(52) U.S. Cl.
USPC ............... 358/1.14; 358/1.15; 726/4; 726/26; 726/28

(58) Field of Classification Search
USPC ........................................ 358/1.14, 1.15, 1.9
See application file for complete search history.

(56) References Cited

U.S. PATENT DOCUMENTS

| 2004/0184053 | A1* | 9/2004 | Okuoka et al. | 358/1.15 |
| 2006/0290967 | A1 | 12/2006 | Sumitomo et al. | |
| 2010/0134822 | A1* | 6/2010 | Kimura et al. | 358/1.14 |
| 2010/0259776 | A1* | 10/2010 | Inui | 358/1.9 |

FOREIGN PATENT DOCUMENTS

JP 2007-4512 1/2007

* cited by examiner

*Primary Examiner* — Benny Q Tieu
*Assistant Examiner* — Juan M Guillermety
(74) *Attorney, Agent, or Firm* — Finnegan, Henderson, Farabow, Garrett & Dunner, L.L.P.

(57) ABSTRACT

An image processing apparatus including: a job reception section which accepts a job to output an image; a job execution section which executes the job accepted by the job reception section and outputs the image; and a control section which, in cases where the job accepted by the job reception section is a job which requires an approval for outputting the image, makes the job under an approval waiting state, and transmits an approval request notice requiring the approval of an approver for outputting the image by the job, and in cases of receiving an approval notice indicating the approval, switches whether to execute a first execution operation that automatically executes the job, or to execute a second execution operation that executes the job after receiving an execution instruction operation, according to an attribute of the job.

18 Claims, 32 Drawing Sheets

■ SENDING AN APPROVAL REQUEST NOTICE MAIL

[DATE OF REQUEST] 2010/10/01 14:30
[JOB No.] 001

☐ AWAITING AN APPROVAL BY THE SETTING BELOW

[JOB TYPE] PRINT
[RECOVERY MODE] WAITING MODE
[TRANSMISSION DESTINATION INFORMATION] 042-660-XXXX KM
[APPROVER INFORMATION] SUPERIOR A
[USER INFORMATION] SUBORDINATE A

■ PLEASE CONFIRM THE ABOVE AND SEND BACK BY
  SELECTING ONE FROM RESPECTIVE ITEMS OF THE
  APPROVAL NOTICE COLUMN BELOW

☐ APPROVAL NOTICE COLUMN

[APPROVAL STATUS] APPROVED, REJECTED
[JOB TYPE] PRINT
[RECOVERY MODE] WAITING MODE, (IMMEDIATE START MODE)

- ■ SENDING AN APPROVAL REQUEST NOTICE MAIL

[DATE OF REQUEST] 2010/10/01 14:30
  [JOB No.] 001

□ AWAITING AN APPROVAL BY THE SETTING BELOW

[JOB TYPE] PRINT
  [RECOVERY MODE] WAITING MODE
  [TRANSMISSION DESTINATION INFORMATION] 042-660-XXXX KM
  [APPROVER INFORMATION] SUPERIOR A
  [USER INFORMATION] SUBORDINATE A

■ PLEASE CONFIRM THE ABOVE AND SEND BACK BY SELECTING ONE FROM RESPECTIVE ITEMS OF THE APPROVAL NOTICE COLUMN BELOW

□ APPROVAL NOTICE COLUMN

[APPROVAL STATUS] APPROVED
  [JOB TYPE] PRINT
  [RECOVERY MODE] WAITING MODE

- ■ SENDING AN APPROVAL REQUEST NOTICE MAIL

[DATE OF REQUEST] 2010/10/01 14:30
  [JOB No.] 001

□ AWAITING AN APPROVAL BY THE SETTING BELOW

[JOB TYPE] PRINT
  [RECOVERY MODE] WAITING MODE
  [TRANSMISSION DESTINATION INFORMATION] 042-660-XXXX KM
  [APPROVER INFORMATION] SUPERIOR A
  [USER INFORMATION] SUBORDINATE A

■ PLEASE CONFIRM THE ABOVE AND SEND BACK BY SELECTING ONE FROM RESPECTIVE ITEMS OF THE APPROVAL NOTICE COLUMN BELOW

□ APPROVAL NOTICE COLUMN

[APPROVAL STATUS] APPROVED
  [JOB TYPE] PRINT
  [RECOVERY MODE] (IMMEDIATE START MODE)

■ SENDING AN APPROVAL REQUEST NOTICE MAIL

[DATE OF REQUEST] 2010/10/01 14:35
[JOB No.] 002

☐ AWAITING AN APPROVAL BY THE SETTING BELOW

[JOB TYPE] TRANSMISSION
[RECOVERY MODE] IMMEDIATE START MODE
[TRANSMISSION DESTINATION INFORMATION] 042-660-XXXX KM
[APPROVER INFORMATION] SUPERIOR B
[USER INFORMATION] SUBORDINATE B

■ PLEASE CONFIRM THE ABOVE AND SEND BACK BY
SELECTING ONE FROM RESPECTIVE ITEMS OF THE
APPROVAL NOTICE COLUMN BELOW

☐ APPROVAL NOTICE COLUMN

[APPROVAL STATUS] APPROVED, REJECTED
[JOB TYPE] TRANSMISSION
[RECOVERY MODE] IMMEDIATE START MODE, (WAITING MODE)

■ SENDING AN APPROVAL REQUEST NOTICE MAIL

[DATE OF REQUEST] 2010/10/01 14:35
[JOB No.] 002

☐ AWAITING AN APPROVAL BY THE SETTING BELOW

[JOB TYPE] TRANSMISSION
[RECOVERY MODE] IMMEDIATE START MODE
[TRANSMISSION DESTINATION INFORMATION] 042-660-XXXX KM
[APPROVER INFORMATION] SUPERIOR B
[USER INFORMATION] SUBORDINATE B

■ PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
[JOB TYPE] TRANSMISSION
[RECOVERY MODE] IMMEDIATE START MODE

■ SENDING AN APPROVAL REQUEST NOTICE MAIL

[DATE OF REQUEST] 2010/10/01 14:35
[JOB No.] 002

☐ AWAITING AN APPROVAL BY THE SETTING BELOW

[JOB TYPE] TRANSMISSION
[RECOVERY MODE] IMMEDIATE START MODE
[TRANSMISSION DESTINATION INFORMATION] 042-660-XXXX KM
[APPROVER INFORMATION] SUPERIOR B
[USER INFORMATION] SUBORDINATE B

■ PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
[JOB TYPE] TRANSMISSION
[RECOVERY MODE] (WAITING MODE)

■ SENDING AN APPROVAL REQUEST NOTICE MAIL

[DATE OF REQUEST] 2010/10/01 14:40
[JOB No.] 003

☐ AWAITING AN APPROVAL BY THE SETTING BELOW

[JOB TYPE] TRANSMISSION + PRINT
[RECOVERY MODE] WAITING MODE
[TRANSMISSION DESTINATION INFORMATION] 042-660-XXXX KM
[APPROVER INFORMATION] SUPERIOR C
[USER INFORMATION] SUBORDINATE C

■ PLEASE CONFIRM THE ABOVE AND SEND BACK BY
   SELECTING ONE FROM RESPECTIVE ITEMS OF THE
   APPROVAL NOTICE COLUMN BELOW

☐ APPROVAL NOTICE COLUMN

[APPROVAL STATUS] APPROVED, REJECTED
[JOB TYPE] TRANSMISSION + PRINT, TRANSMISSION, PRINT
[RECOVERY MODE] WAITING MODE, (IMMEDIATE START MODE)

- SENDING AN APPROVAL REQUEST NOTICE MAIL

[DATE OF REQUEST] 2010/10/01 14:40
  [JOB No.] 003

☐ AWAITING AN APPROVAL BY THE SETTING BELOW

[JOB TYPE] TRANSMISSION + PRINT
  [RECOVERY MODE] WAITING MODE
  [TRANSMISSION DESTINATION INFORMATION] 042-660-XXXX KM
  [APPROVER INFORMATION] SUPERIOR C
  [USER INFORMATION] SUBORDINATE C

- PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
  [JOB TYPE] PRINT
  [RECOVERY MODE] WAITING MODE

- SENDING AN APPROVAL REQUEST NOTICE MAIL

[DATE OF REQUEST] 2010/10/01 14:40
  [JOB No.] 003

☐ AWAITING AN APPROVAL BY THE SETTING BELOW

[JOB TYPE] TRANSMISSION + PRINT
  [RECOVERY MODE] WAITING MODE
  [TRANSMISSION DESTINATION INFORMATION] 042-660-XXXX KM
  [APPROVER INFORMATION] SUPERIOR C
  [USER INFORMATION] SUBORDINATE C

- PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
  [JOB TYPE] TRANSMISSION
  [RECOVERY MODE] (IMMEDIATE START MODE)

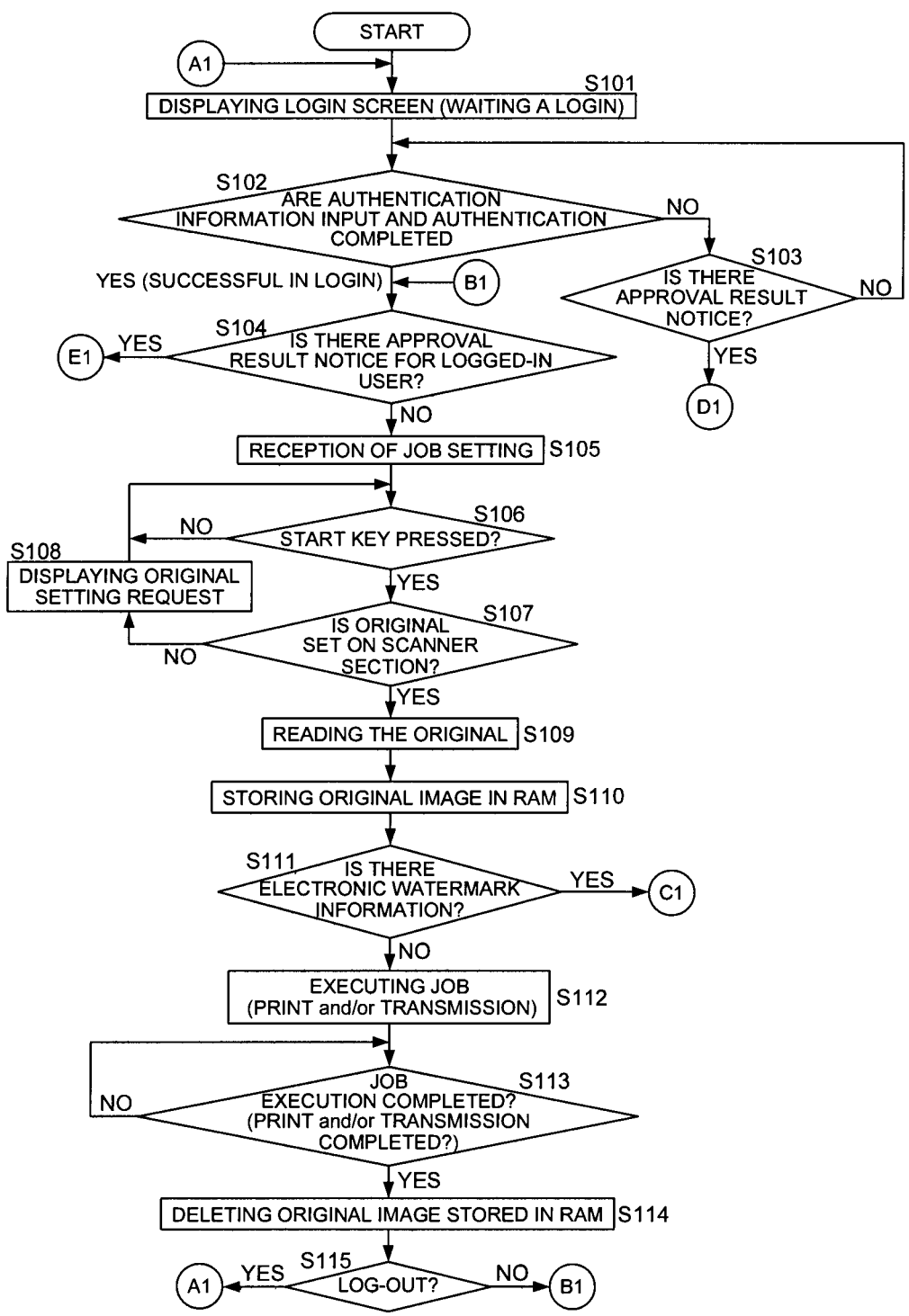

■ SENDING AN APPROVAL REQUEST NOTICE MAIL

[DATE OF REQUEST] 2010/10/01 14:45
[JOB No.] 004

☐ AWAITING AN APPROVAL BY THE SETTING BELOW

[JOB TYPE] STORAGE
[RECOVERY MODE] IMMEDIATE START MODE
[TRANSMISSION DESTINATION INFORMATION] 042-660-XXXX KM
[APPROVER INFORMATION] SUPERIOR D
[USER INFORMATION] SUBORDINATE D

■ PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED, REJECTED
[JOB TYPE] STORAGE
[RECOVERY MODE] IMMEDIATE START MODE, (WAITING MODE)

- SENDING AN APPROVAL REQUEST NOTICE MAIL

[DATE OF REQUEST] 2010/10/01 14:45
[JOB No.] 004

☐ AWAITING AN APPROVAL BY THE SETTING BELOW

[JOB TYPE] STORAGE
[RECOVERY MODE] IMMEDIATE START MODE
[TRANSMISSION DESTINATION INFORMATION] 042-660-XXXX KM
[APPROVER INFORMATION] SUPERIOR D
[USER INFORMATION] SUBORDINATE D

- PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
[JOB TYPE] STORAGE
[RECOVERY MODE] IMMEDIATE START MODE

- SENDING AN APPROVAL REQUEST NOTICE MAIL

[DATE OF REQUEST] 2010/10/01 14:45
[JOB No.] 004

☐ AWAITING AN APPROVAL BY THE SETTING BELOW

[JOB TYPE] STORAGE
[RECOVERY MODE] IMMEDIATE START MODE
[TRANSMISSION DESTINATION INFORMATION] 042-660-XXXX KM
[APPROVER INFORMATION] SUPERIOR D
[USER INFORMATION] SUBORDINATE D

- PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
[JOB TYPE] STORAGE
[RECOVERY MODE] (WAITING MODE)

- SENDING AN APPROVAL REQUEST NOTICE MAIL

[DATE OF REQUEST] 2010/10/01 14:50
[JOB No.] 006

☐ AWAITING AN APPROVAL BY THE SETTING BELOW

[JOB TYPE] PRINT
[RECOVERY MODE] WAITING MODE
[TRANSMISSION DESTINATION INFORMATION] 042-660-XXXX KM
[APPROVER INFORMATION] SUPERIOR E
[USER INFORMATION] SUBORDINATE E

- PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED, REJECTED
[JOB TYPE] PRINT, STORAGE
[RECOVERY MODE] WAITING MODE (IMMEDIATE START MODE)

- SENDING AN APPROVAL REQUEST NOTICE MAIL

[DATE OF REQUEST] 2010/10/01 14:50
[JOB No.] 006

☐ AWAITING AN APPROVAL BY THE SETTING BELOW

[JOB TYPE] PRINT
[RECOVERY MODE] WAITING MODE
[TRANSMISSION DESTINATION INFORMATION] 042-660-XXXX KM
[APPROVER INFORMATION] SUPERIOR E
[USER INFORMATION] SUBORDINATE E

- PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
[JOB TYPE] PRINT
[RECOVERY MODE] WAITING MODE

- ■ SENDING AN APPROVAL REQUEST NOTICE MAIL

[DATE OF REQUEST] 2010/10/01 14:55
    [JOB No.] 007

☐ AWAITING AN APPROVAL BY THE SETTING BELOW

[JOB TYPE] STORAGE
    [RECOVERY MODE] WAITING MODE
    [TRANSMISSION DESTINATION INFORMATION] 042-660-XXXX KM
    [APPROVER INFORMATION] SUPERIOR F
    [USER INFORMATION] SUBORDINATE F

- ■ PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED, REJECTED
    [JOB TYPE] PRINT, STORAGE
    [RECOVERY MODE] WAITING MODE (IMMEDIATE START MODE)

- ■ SENDING AN APPROVAL REQUEST NOTICE MAIL

[DATE OF REQUEST] 2010/10/01 14:55
    [JOB No.] 007

☐ AWAITING AN APPROVAL BY THE SETTING BELOW

[JOB TYPE] STORAGE
    [RECOVERY MODE] WAITING MODE
    [TRANSMISSION DESTINATION INFORMATION] 042-660-XXXX KM
    [APPROVER INFORMATION] SUPERIOR F
    [USER INFORMATION] SUBORDINATE F

- ■ PLEASE CONFIRM THE ABOVE AND SEND BACK BY SELECTING ONE FROM RESPECTIVE ITEMS OF THE APPROVAL NOTICE COLUMN BELOW

☐ APPROVAL NOTICE COLUMN

[APPROVAL STATUS] APPROVED
    [JOB TYPE] STORAGE
    [RECOVERY MODE] WAITING MODE

IMAGE PROCESSING APPARATUS AND IMAGE PROCESSING METHOD FOR EXECUTING A JOB REQUIRING AN APPROVAL OF IMAGE OUTPUT

CROSS REFERENCE TO RELATED APPLICATION

This application is based on Japanese Patent Application Nos. 2010-181864 filed on Aug. 16, 2010, and 2010-256260 filed on Nov. 16, 2010 with Japanese Patent Office, the entire content of which is hereby incorporated by reference.

BACKGROUND OF THE INVENTION

1. Technical Field

The present invention relates to an image processing apparatus and an image processing method, and particularly relates to an image processing apparatus and an image processing method which ensure security by requiring approval for outputting the image.

2. Description of the Prior Art

For an image processing apparatus such as a multi function peripheral (MFP), it is required to previously prevent inadvertent print, transmission, or storage of confidential documents by users. With that background, regarding information leak by a user, a technology to ensure the security has been introduced, where an administrator is made intervene in output process of confidential documents such that the output process cannot be executed without an approval by the administrator.

For example, Unexamined Japanese Patent Application Publication No. 2007-4512 (Patent Document 1) discloses an image processing apparatus which, in cases of receiving an instruction of outputting a confidential document, withholds the outputting process, transmits an approval request to an approver, and notifies the user of the approval result received from the approver. In case of receiving the approver's approval, the apparatus notifies the user of that effect, and execute the output via receiving an instruction of releasing the withholding of output. Other than this, Patent Document 1 discloses that in case of receiving the approver's approval, the apparatus may immediately outputs the document and notifies the user of the approval result after executing the output. Namely with respect to the outputting process which is made to be approval waiting state, a configuration of starting the output by receiving the instruction by the user after the approver's approval, and a configuration of immediately starting the output after the approval are disclosed.

As image outputting forms by the MFP and the like, there are print, transmission, storage and the like, and these are different in confidential level (security level), from the view point whether these outputted images have possibility of being viewed by anyone else.

For example, in the above described technology, in the configuration of immediately starting the output after the approval, in case of executing a print job, when the user instructing the print of confidential document is absent, if receive the approval the image processing apparatus immediately start the printing of the confidential document, then the printed material of the confidential document ejected on an ejection tray is left out and may be viewed by anyone else, which is a problem in security.

In contrast, in the case of transmission, being different from the printing, since the output material is outputted to the transmission destination, the output material cannot be viewed by anyone being at the side of transmitting image processing apparatus. Therefore, even the confidential document may be started transmission immediately after receiving the approval. However, in the configuration of starting the processing by receiving the instruction by the user after the approver's approval, in cases of executing the job of transmission, the transmission of the approved confidential document is not started until the user instruct separately, and it takes time before transmitting to the destination, which causes a problem to quick processing. In the case of storage, similarly to the transmission, since the output material is outputted to the place of storage, the output material cannot be viewed by anyone being in the periphery of the image processing material, therefore, even the confidential document may be started the storage immediately after receiving the approval. Therefore, since the storage of the approved confidential document is not started until the user instruct separately, this configuration causes a problem in view of quick processing. Further, it is laborious for the user to come to the image processing apparatus for separately instructing the transmission or the storage.

Further, it is a bother for the user to manually set, in every case, switching of whether to immediately start after the approval or to start by receiving the instruction from user after the approval.

In order to solve the above problem, an object of the present invention is to provide an image processing apparatus which is capable of automatically switching the start timing, of the approval waiting job after receiving the approval, to be proper timing in consideration of ensuring security and quick processing.

SUMMARY

In order to solve at least one of the above problems, an image forming apparatus reflecting one aspect of features of the present invention includes: a job reception section which accepts a job to output an image; a job execution section which executes the job accepted by the job reception section and outputs the image; and a control section which, in cases where the job accepted by the job reception section is a job that requires an approval for outputting the image, makes the job under an approval waiting state, and transmits an approval request notice requiring the approval of an approver with respect to outputting the image by the job, and in cases of receiving an approval notice indicating the approval to outputting the image by the job requiring the approval, switches, according to attribute of the job, to whether to execute a first execution operation that automatically executes the job, or to execute a second execution operation that executes the job after receiving an execution instruction operation.

BRIEF DESCRIPTION OF THE DRAWINGS

These and other objects, advantages and features of the invention will become apparent from the following description thereof taken in conjunction with the accompanying drawings in which:

FIG. 3 is a diagram showing an example of approval request notice mail relating to a print job;

FIGS. 4*a* and 4*b* are diagrams showing examples of approval result notice mail with respect to the approval request notice mail of FIG. 3;

FIG. 5 is a diagram showing an example of approval request notice mail relating to a transmission job;

FIGS. 6*a* and 6*b* are diagrams showing examples of approval result notice mail with respect to the approval request notice mail of FIG. 5;

FIG. 7 is a diagram showing an example of approval request notice mail relating to a "transmission+print" job;

FIGS. 8*a* and 8*b* are diagrams showing examples of approval result notice mail with respect to the approval request notice mail of FIG. 7;

FIG. 9 is a flow chart (1/4) showing a flow of job execution operation by the MFP relating to the first embodiment of the present invention;

FIG. 17 is a diagram showing an example of approval request notice mail relating to a storage job;

FIGS. 18*a* and 18*b* are diagrams showing examples of approval result notice mail with respect to the approval request notice mail of FIG. 17;

FIGS. 19*a* and 19*b* are diagrams respectively showing a variant example of approval request notice mail relating to a print job and a example of approval result notice mail with respect to this variant example of approval request notice mail;

FIGS. 20*a* and 20*b* are diagrams respectively showing a variant example of approval request notice mail relating to a storage job and a example of approval result notice mail with respect to this variant example of approval request notice mail;

DETAILED DESCRIPTION OF THE PREFERRED EMBODIMENT

Figure 1:
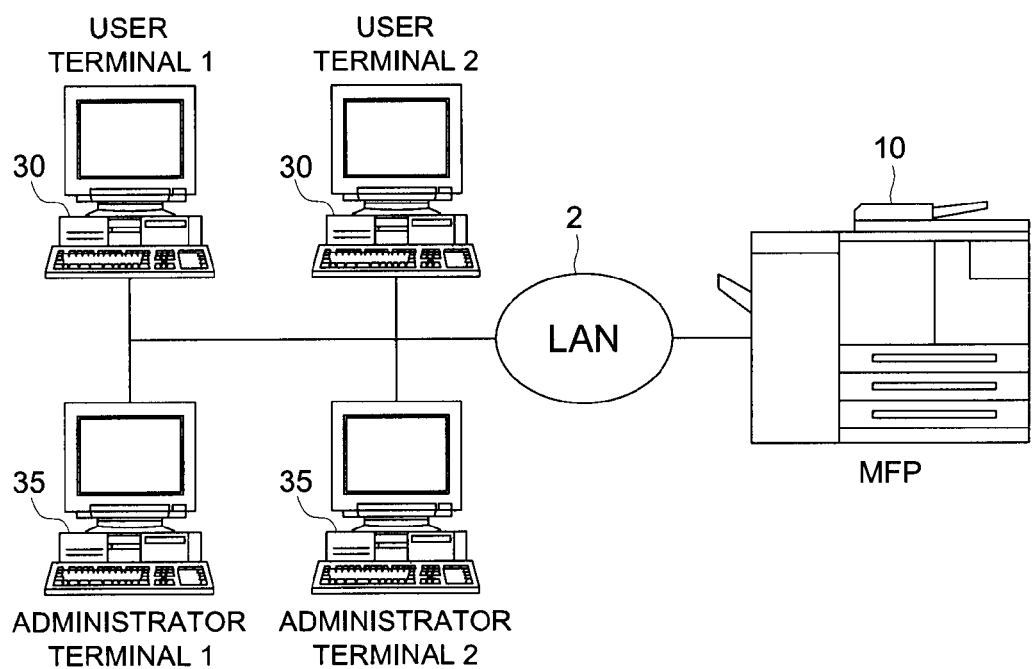
FIG. 1 is a system configuration diagram showing the system configuration relating to the first embodiment of the present invention.

Referring to the drawings, embodiments of the present invention will be described below.

First Embodiment

FIG. 1 shows a system configuration relating to the first embodiment of the present invention. The present system is configured with network 2, such as LAN (Local Area Network) provided in an office and the like, connected with MFP (Multi function Peripheral) 10 as an image processing apparatus, user terminal 10, and administrator terminal 35. User terminal 30 is, for example, a terminal apparatus to be used by a user (managed person) belonging to an office department, and each of a plurality of user terminal 30 being allocated to each user is connected to the LAN. Administrator terminal 35 is a terminal apparatus to be used by an administrator (or department manager) of the office department where the user belongs, and each of a plurality of administrator terminal 35 being allocated to each user is connected to the LAN.

User terminal 30 and administrator terminal 35 are provided with functions of transmitting a scanning job or a print job to MFP 10 and requiring those executions. These terminal apparatuses are structured with personal computers (PC) and the like installed with an OS program, a driver program of MFP 10, application programs to create and edit documents and images, electronic mail program and the like. Various requests to MFP 10 such as requests of transmission or execution of scanning job and/or print job is performed by the driver program of MFP 10. These terminals are configured to execute notification regarding the jobs between MFP 10 via electronic mails, and transmitting and receiving the electronic mails are performed by the electronic mail program.

Figure 2:
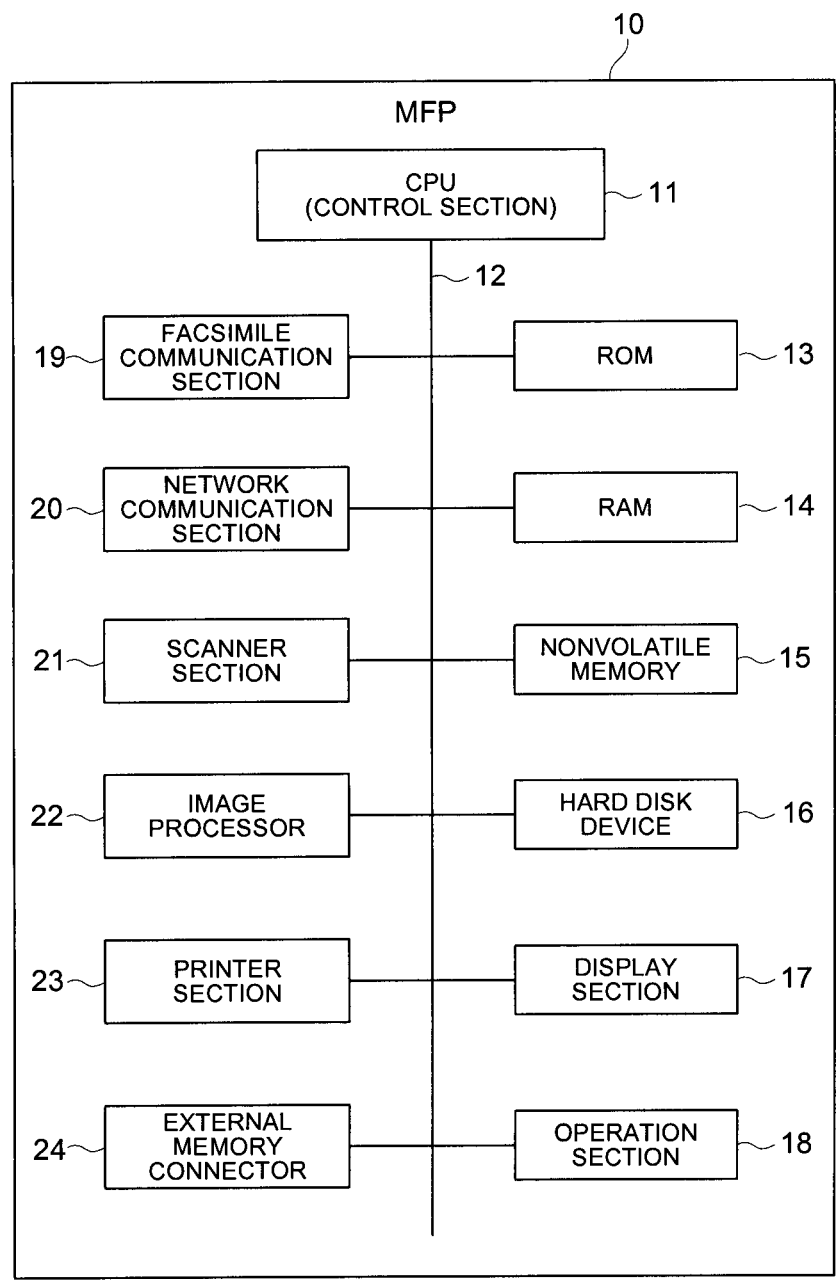
FIG. 2 is a block diagram showing the outline configuration of an MFP as the image processing apparatus relating to the first embodiment of the present invention.

FIG. 2 shows an outline configuration of MFP 10. MFP 10 is provided with a copy function to optically read an image of original document and print its duplication image on a recording sheet, a scanning function to store a file of the read-out original document image and transmit to a terminal apparatus or a server, a printer function to print the image based on print data received from the terminal apparatus or the image based on the image data stored in MFP 10, and a facsimile function. And MFP 10 is further provided with the electronic mail function and a user authentication function.

MFP 10 is configured with connecting ROM (Read Only Memory) 13, RAM (Random Access Memory) 14, nonvolatile memory 15, hard disc device 16, display section 17, operation section 18, facsimile communication section 19, network communication section 20, scanner section 21 image processor 22, printer 23 and external memory connector 24, to CPU (Central Processing Unit) 11 as a control section, via bus 12.

CPU 11 controls the movement of MFP 10 based on the program stored in ROM 13. In Rom 13 stored are various program and various fixed data to be executed by CPU 11. In addition to be used as a work memory for temporarily storing various data when CPU 11 executes a program, RAM 14 is used as an image memory for temporarily storing the image data. Nonvolatile memory 15 is a rewritable memory which can keep information and memory even when the power source is turned off. In nonvolatile memory 15, stored are information inherent to the apparatus and various setting information. And further stored in nonvolatile memory 15 are authentication information to be used at the time of authentication such as user ID (Identification) and password, fingerprint information and the like. In addition to storing various storage data, hard disc device 16 stores various inputted image data and the like.

Display section 17 is structured with a liquid crystal display and the like, and displays various screens such as an operation screen, setting screen, and confirmation screen. Operation section 18 is structured with various keys such as a start key, a stop key, and a numeric keypad, touch panel that is provided on the surface of crystal liquid display panel to detect the pushed coordinates positions, and the like. And operation section 18 receives user's various operation conducted with respect to MFP 10.

Facsimile communication section 19 transmits and receives the image data via the public line between external apparatuses provided with a facsimile function. Network communication section 20 communicates with user terminal 30 and administrator terminal 35 via network 2.

Scanner section 21 acquires the image data by optically reading the image of original document. Scanner 21 is structured with a light source to irradiate light on the original document, a line image sensor which receives its reflection light to read the original document by one scanning line, a moving means to sequentially move the reading position by a line unit of the original document in longitudinal direction, an optical system to guide and focus the reflection light from the original document onto the line image sensor, conversion section to convert analogue image signals outputted by the line image sensor into digital image data, and the like.

Image processor 22 executes rasterizing processing to convert the print data into image data, and various image processing on the image data such as image correction, rotation, enlargement/reduction, compression/decompression.

Printer section 23 forms and outputs the image on a recording sheet based on the image data through electrophotographic process. Printer section 23 is configured, for example, with a conveyance unit of the recording sheet, a photosensitive drum, a charging device, an LD (Laser Diode) controlled of lighting according to the inputted image data, a scanning unit to scan the irradiated laser light from the LD on the photosensitive drum, a developing device, a transfer/separation device, a cleaning device, and a fixing device. A printer utilizing the other system may be also utilized such as an LED printer that irradiates the photosensitive drum with an LED (Light Emitting Diode) instead of laser light.

External memory connector 24, being connected with an external memory (nonvolatile external memory device) such as a USB (Universal Serial Bus) memory, performs communication between the connected external memory.

Further, in order to ensure information security, MFP 10 places restrictions on outputting a confidential document by a user.

Specifically, in order to forestall the inadvertent print or transmission of confidential document, an administrator (or approver) is made intervene in output job of confidential documents by the user such that the output job cannot be executed without an approval by the administrator.

The output job received by MFP 10 from the user includes various jobs, being accepted through user's operation on MFP 10, such as copying, scan and transmission, facsimile transmission, and storage; and jobs being received and accepted from the user terminal 30 such as printing and facsimile transmission.

In cases of copying, transmission, and storage of original document by the user's operation, prescribed information is previously attached to the original document such as the confidential document requiring the approval of outputting. MFP 10 automatically determines that outputting of the document is necessary of approval, in case of detecting the prescribed information at the time of scanning. The prescribed information can be attached to the original document by utilizing, for example, a watermark print technology (or electronic watermark) to embed the information being difficult for visual confirmation, on the paper media, or an RFID (Radio Frequency Identification) technology to embed the IC chip (RF tag), that memorizes and wirelessly communicates electronic information (ID information), in the paper media.

With respect to the electronic watermark information attached to the original document, MFP 10 analyzes, with image processor 22, the image data obtained by reading the original document at scanner section, and determines based on whether the electronic watermark information is included in the image data. With respect to the electronic information (ID information) attached to the original document, MFP 10 determines based on whether RF tag reader, provided at scanner section 21, reads out the electronic information from the original document or not, when scanner section 21 reads out the original document.

With respect to printing or facsimile transmission from user terminal 30, in cases where user terminal stores a scanned image file of the original added with the prescribed information (electronic watermark information), when MFP 10 receives from the user terminal and outputs (print/transmission) an image of the file (print data), image processor 22 analyzes the image of file to determine whether the electronic watermark is contained in the file. Outputting of the file containing the electronic watermark is determined to be required of approval.

Further, in cases of accepting a job that requires the approval for outputting the image, MFP 10 makes the job under an approval waiting state, and transmits an approval request notice mail requiring the approval of an approver with respect to outputting the image by the job to a prescribed approver (administrator terminal 35). In cases of receiving an approval result notice mail, and the approval result (approval state) is indicated to be approved state (having been approved), MFP 10 switches the execution operation (recovery mode) of the job under the waiting state to immediate start mode or to waiting mode according to attributes of the job. In case of immediate start mode, the job is automatically executed after receiving the approval. In case of waiting mode, after receiving the approval, MFP 10 makes the job wait until receiving an execution instruction operation from the user (operator) who has an execution authority, and after receiving the execution instruction operation, MFP 10 executes the job.

In the present embodiment, the attributes to be a determination factor for the above switching are outputting modes in the case of outputting the image. As the outputting modes of the image, MFP 10 has plural types of outputting modes such as printing, transmission, and storage. Further, jobs are classified into the printing, transmission, storage and the like, and the outputting modes correspond to the job types. In the present embodiment as the job type (outputting mode), three type examples of print type job, transmission type job, and combination job of transmission and printing will be described. Regarding storage type job, will be described in the second to fourth embodiments.

The print type job is specifically, a copy job to be received through user's operation, a print job to be received from user terminal 30, and the like. The transmission type job is specifically, a scan-and-transmission job to be received through user's operation of from user terminal 30, a facsimile transmission job, and the like. Further, in the scan-and-transmission job by the user's operation, there are jobs such as a scan-to-electronic mail (E mail) to transmit a scanned image (file) of original document to a specified address as an attached file of the electronic mail, a scan-to-FTP to store the scanned image (file) in a specified holder of the FTP (File Transfer Protocol) server connected to the network, and a scan-to-SMB (Server Message Block) to store the scanned image (file) directly in a specified holder of the terminal apparatus connected to the network. The "transmission+print" job is for example a job of printing the transmitted image after the transmission (Print After Send).

FIGS. 3 to 8b show examples of the approval request notice mail (41, 42, 43) that MFP 10 transmits to administrator terminal 35, and the approval result notice mail (51a, 51b, 52a, 52b, 53a, 53b) that MFP 10 receives from administrator terminal 35.

The approval request notice mail is a notice mail which is automatically generated by MFP 10 at the time of receiving the job requiring an approval for image outputting, and transmitted from said MFP 10 to administrator terminal 35 of approver. The approval result notice mail (reply mail) is a notice mail which is formed by the approver for the approval request notice mail by using a reply function of the electronic mail program, and sent back from said administrator terminal 35 to MFP 10.

In the approval request notice mail (41-43), various massages and information regarding the approval requiring job are described. For example, described are: a message indicating that said mail is the approval request notice mail, date and time of request, job No., job ID, information indicating the job setting (content of approval request, such as job type, recovery mode, transmission destination information, approver information, and user information), a message indicating how to approve for said mail, and plural items in an approval notice column (approval status, job type, and recovery mode).

The recovery modes to be described in the approval request notice mail are above described "immediate start mode" to automatically execute the job after the approval, and "waiting mode" to execute the job by receiving the execution instruction operation form the user, after the approval. As the recovery mode, either one of immediate start mode or waiting mode is automatically selected by a default setting according to the job type. In the present embodiment, according to the default setting, the waiting mode is automatically selected for the print job, immediate start mode is automatically selected for the transmission job, and the waiting mode is automatically selected for the "transmission+print" job. Further, the automatically selected recovery mode is configured to be changed by the user (user selection). The automatic selection of recovery mode by the default setting, and the user selection will be described later.

Further, as each item (approval status, job type, recovery mode) in the approval notice column of the approval request notice male, a plurality of information (alternatives), from which a single choice will be selected, are described. In "job type", the plurality of information (alternatives) are described only in cases where job type of approval requiring job relating to said approval requiring notice mail is "print+transmission".

Specifically, in the item of "approval status", two alternatives of "approved" and "rejected" are described. In the item of "job type", three alternatives of "transmission+print", "transmission", and "print" are described only in cases where job type of approval requiring job relating to said approval requiring notice mail is "print+transmission" (refer to FIG. 7). Further, in cases where job type of approval requiring job relating to said approval requiring notice mail is printing (print type) or transmission (transmission type), "print" or "transmission" is singularly described (refer to FIGS. 3 and 5). In the item of "recovery mode", two alternatives of "immediate start mode" and "waiting mode" are described. Further, a part of the recovery mode information, which is not set (not selected), is described in parentheses. The recovery mode having been set for said job is identifiable by the existence or non-existence of these parentheses.

The approver forms the reply mail to the approval request notice mail by using the reply function of electronic mail program, deletes a part of the information (alternatives) described in each item of approval notice column of the reply mail, and completes the approval result notice mail. By deleting a part of described information in the approval notice column, the approver determines the approval result (approved/rejected) for the requested approval contents, and changes the approval contents as necessary. In the present embodiment, the approver can change the recovery mode and job type (output mode) of "transmission+print" job.

The approval method to be conducted by deleting a part of described information in the approval notice column, namely how to approve, and how to change the approval content will be described below.

As described above, at "approval status" in the approval notice column, "approved" and "rejected" are described. In case of approving (agreement), the approver leaves "approved" by deleting "rejected". In case of rejection (disapproval), the approver deletes "approved" and leaves "rejected".

Regarding "job type" in the approval notice column, in cases where the approval requiring job is printing type or transmission type, "print" or "transmission" is singularly described.

FIG. 3 shows an example of the approval request notice mail in cases where the approval requiring job is printing type (only printing), and FIG. 4 shows the approval result notice mail with respect to the approval request notice mail of FIG. 3. In the case of print job, for the "job type" in the approval notice column of the approval request notice mail, "print" is described.

FIG. 5 shows an example of approval request notice mail in cases where the approval requiring job is transmission type, and FIGS. 6a and 6b show the approval result notice mails with respect to the approval request notice mail of FIG. 5. In the case of transmission job, for the "job type" in the approval notice column of the approval request notice mail, "transmission" is described.

In cases where "print" or "transmission" is singularly described in "job type", the approver cannot change the described job type in the approval result notice mail.

FIG. 7 shows an example of approval request notice mail in cases where the approval requiring job is "transmission+print", and FIGS. 8a and 8b show the approval result notice mails with respect to the approval request notice mail of FIG. 7. In the case of "transmission+print" job, for the "job type" in the approval notice column of the approval request notice mail, three types of job "transmission+print", "transmission" and "print" are described. In the case of (transmission+print) job, change from (transmission+print) to (transmission only) or change from (transmission+print) to (print only) is capable. In the approval result notice mail, the approver leaves one piece of job type information to be approved out of these three job type information by deleting the other two job type information to select the job type to be approved.

Specifically, in case of approving "transmission+print", the approver leaves "transmission+print", and deletes the other two information. In cases where the approver approves only "print" while does not approve "transmission", the approver leaves "print" and deletes the other two job types as shown in FIG. 8a. On the other hand, in cases where the approver approves only "transmission" while does not approve "print", the approver leaves "transmission" and deletes the other two job types as shown in FIG. 8b.

In "recovery mode" of the approval notice column, two pieces of recovery mode information of "immediate start mode" and "waiting mode" are described. With respect to the approval requiring job, the recovery mode information, which has not been set at the time of approval request, is previously described in parentheses. The approver deletes the recovery mode not to be approved, and leaves the recovery mode to be approved in order to select said recovery mode to be approved. Further, as examples of changing the recovery mode, there may be cases where the waiting mode having been set regarding the print job is changed to the immediate start mode, as shown in FIG. 4b, and the immediate start mode having been set regarding the transmission job is changed to the waiting mode, as shown in FIG. 6b.

The setting condition of recovery mode at the time of approval request is identifiable by existence of the parentheses. In cases of approving the setting of at the time of approval request as it is, without changing the recovery mode, the approver may leave the information described in the "recovery mode" as it is, without deleting a part of the described information. In this case the recovery mode without parentheses (the recovery mode having been set at the time of approval request) is determined to be approved. Only in case of changing the recovery mode, it is required to delete the recovery mode without parentheses and leave the recovery mode in parentheses. In this case, the recovery mode is determined to be approved by changing to that being in parentheses (the recovery mode having not been set at the time of approval request).

The approver operates administrator terminal 35 to form the approval result notice mail (51a-53b) for the approval request notice mail (41-43) with the above described method, and reply to MFP 10. In the approval result notice mail received by MFP 10, the approval result notice mail, in which "approved" is described in "approval status", becomes the "approval notice mail" indicating the approval to the approval requiring job (image output by said job). The approval result notice mail, in which "rejected" is described in "approval status", becomes the "rejection notice mail" indicating the rejection to the approval requiring job (image output by said job).

Next, the operation of MFP 10 will be described.

FIGS. 9-12 are flow charts showing the operations of job execution by MFP 10. FIGS. 13-16 are drawings showing examples of screens displayed on display section of MFP 10 by these operations. The operations of MFP 10 will be described in detail by using these drawings.

Here, examples of copying job of an original document (duplication printing) and transmission job, that will be executed by MFP 10 in response to the operation of a user (or an operator), will be described. Where, MFP 10 determines (automatically determines) whether an approval is required or not for outputting the image read from the original document, by the existence of electronic watermark information.

For example, on the original document of confidential document, prescribed information of characters ("confidential", "for internal use only", etc.) or marks, indicating that the information in said original document is confidential (required of approval for outputting), is previously added with the electronic watermark.

In cases where there is no electronic watermark information in the image obtained by reading the original document, MFP 10 determines that the approval for outputting said image is not required. In cases where there is electronic watermark information, MFP 10 determines that the approval for outputting said image is necessary (required of approval), and requests to a prescribed approver.

The prescribed approver may be predetermined to be one approver, or may be determined in accordance with every user or every original document from a plurality of approvers.

In case of determining by every user, it is preferable to determine an administrator (superior) of the user (subordinate), who instructs the execution of approval requiring job, to be the approver. For example, MFP 10 memorizes in non-volatile memory a department information table (list) in which registered are department name, belonging users for each department, administrator for each department, and destination of approval request notice (ID, IP address, electronic mail address of administrator terminal 35), and based on the table information, MFP 10 specifies the administrator of the user instructing the execution of approval requiring job, and requests of the approval from the administrator (approver).

In case of determining by every original document, for example, by previously making the electronic watermark information of the approver information (identification information of department administrator such as a name), and ID, IP address, and electronic mail address of administrator terminal 35, and attaching the watermark information onto every original document, MFP 10 identifies the administrator by every original document, and requests the approval from the administrator (approver). In cases where the approver information is attached on the original document, since MFP 10 can automatically determine the necessity of approval for outputting the image of said original document, the above described information of characters or marks, indicating that the information in said original document is confidential, can be omitted.

In addition to control the job, determined to be requiring the approval for outputting the image, to make under approval waiting state, MFP 10 controls to save the image data of the original document relating to said job into hard disc device 16 from RAM 14 which temporarily stores the image data. Further, MFP 10 correlates the setting information relating to said job (job type information, destination information in case of transmission job, and the like), approver information (administrator information), user information (operator information), and recovery mode information for said job (job ID, etc.), and stores in nonvolatile memory 15. And, by utilizing the information, MFP 10 forms the approval request notice mail and transmits to the approver.

With respect to FIGS. 9-12, the flow will be explained regarding the execution of: a normal job (not requiring approval) received from a login user (operator), approval waiting (storage/control) of the approval requiring job, transmitting of approval request notice mail, receiving of approval result notice mail, and executing/not executing of the approval waiting job according to the approval result Further, in the present embodiment, the approver is determined by every original document. Namely, the approver information is added in the original document in the form of electronic watermark, MFP 10 requests an approval for outputting the image of said original document to the approver indicated by the approver information of electronic watermark having been read from said original document.

Figure 13:
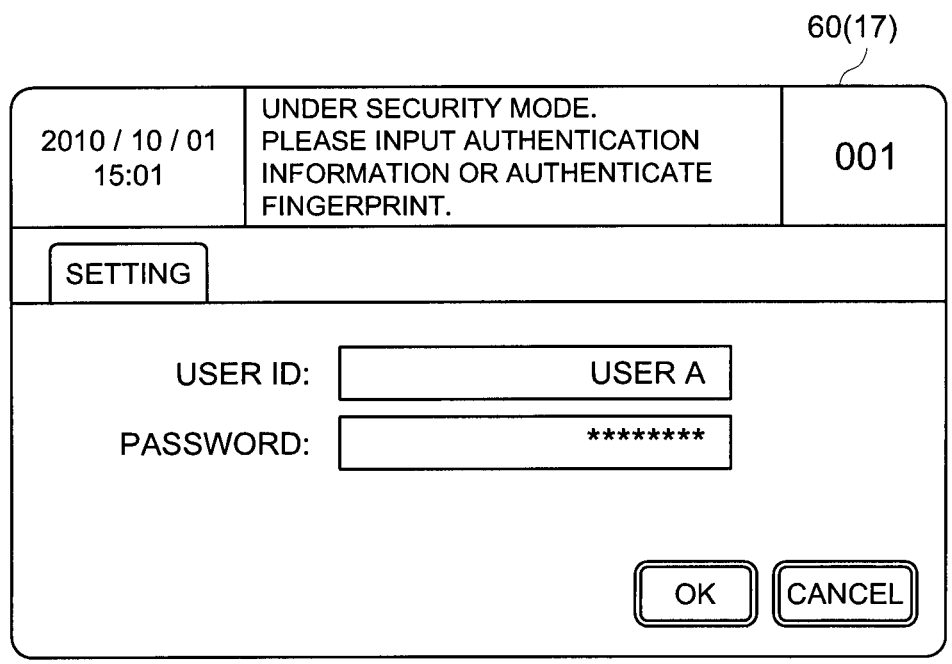
FIG. 13 is a diagram showing an example of login screen displayed on a display section of the MFP.

In cases where MFP 10 is moving under the security mode, CPU 11 displays a login screen that receives an input of authentication information for identifying the user (operator), on display section 17 (Step S101). FIG. 13 shows an example of login screen 60. In this example, the authentication information necessary for the login is a user ID and password, or finger print information, and the like. Input of the user ID and password are received through key operations of operation section 18. Input of the fingerprint information is received through reading of a fingerprint by a fingerprint reader.

In FIG. 9, CPU 11 monitors if there is an input of authentication information from the user, and if not (Step S102; No), monitors whether there is an approval result notice mail or not (Step S103).

In case of receiving the input of authentication information, crosschecking said authentication information with authentication information for verification stored in nonvolatile memory 15, and completing the authentication (Step S102; Yes: successful in login), CPU 11 searches if the approval result notice mail for the login user is available (Step S104). If there is a relevant approval result notice mail (Step 104; Yes), moves to Step S151 in FIG. 12 (details will be described later). If there is no relevant approval result notice mail (Step 104; No), receives a job setting from the user (Step S105).

Here, CPU 11 receives the setting of copy job of original document (duplication printing), transmission job of original document job, or transmission+print job of original document In the setting of transmission job and transmission+print job, receives the setting of transmission destination (transmission address). After completing the job setting, the user press the start key of operation section 18 to instruct the job execution to MFP 10.

If the start key is pressed (Step S106; Yes), CPU 11 detects if any original document is set on scanner section 21 (Step S107). If not detecting the original document (Step S107; No), display a message on display section 17 to urge a warning to the user, such as "Please set original document" (Step S108). Then returning to Step S106, the flow goes to the state of waiting the press of start key.

In case of detecting the original document being set on scanner section 21 when the start key is pressed (Step S107; Yes), CPU 11 accepts the job having been set, and gives an ID (job No.) to the job. Further, allows the scanner section 21 to start the reading of original document (Step S109), and temporarily stores the image data read by scanner 21 in RAM 14 via image processor 22 (Step S110). At this time, image processor 22 analyzes the image data, and determines whether there is electronic watermark information in the image data. In cases where there are multiple pages of the image data, the determination is executed by one page unit for all pages (Step S111).

In cases where reading of all original document is completed, and there is no electronic watermark information in any page the image data (Step S111; No), CPU 11 execute said job as a normal job (Step S112-Step S113; No).

With respect to the normal job, the image data relating to said job is printed or transmitted according to the setting contents.

In case of copying, CPU 11 controls printer section to print the image based on the image data stored in RAM 14, on a recording sheet to output In case of facsimile transmission, CPU 11 controls facsimile communication section 19 to transmit the image data stored in RAM 14, toward the external apparatus of the destination via the public line. In case of scan and transmission, CPU 11 controls network communication section 20 to transmit the image data stored in RAM 14, toward the external apparatus of the destination or server apparatus via the network 2. Further, in case of transmission (facsimile transmission)+print, CPU 11 controls facsimile communication section 19 to transmit the image data stored in RAM 14 to the external apparatus of the destination via the public line, and after the transmission, controls printer section 23 to print and output the image based on the image data stored in RAM 14 on a recording sheet.

After completing the execution of the job (Step S113; Yes), CPU 11 deletes the image data of the original document stored in RAM 14 relating to said job (Step S114). Then, in case of receiving a logout operation from the user (Step S115; Yes), the flow returns to S101, and in case of not receiving a logout operation (Step S115; No), returns to S104.

On the other hand, in cases where there is electronic watermark information in any one page the image data (Step S111; Yes), CPU 11 temporarily stores said electronic watermark information in RAM 14, and moves to Step S121 in FIG. 10.

In Step S121, CPU 11 confirms the job type of said job. In case of job type being transmission (Step S121; transmission), CPU 11 stores "transmission" indicating the job type of said job by correlating to said job (job ID) in nonvolatile memory 15 (Step S122). And, by displaying the recovery mode selection screen (refer to recovery mode selection screen 70 in FIG. 14) in which immediate tart mode is set to be the initial selection state, on display section 17 (Step S124), moves to Step S129.

In case of job type being print (Step S121; print), CPU 11 stores "print" indicating the job type of said job by correlating to said job (job ID) in nonvolatile memory 15 (Step S125). And, by displaying the recovery mode selection screen in which waiting mode is set to be the initial selection state, on display section 17 (Step S128), moves to Step S129.

In case of job type being transmission+print (Step S121; transmission+print), CPU 11 stores "transmission+print" indicating the job type of said job by correlating to said job in nonvolatile memory 15 (Step S126). And, further stores the transmission destination information set by the user by correlating to said job in nonvolatile memory 15 (Step S127). And, by displaying the recovery mode selection screen in which waiting mode is set to be the initial selection state, on display section 17 (Step S128), moves to Step S129. Meanwhile, the recovery mode to be set as the initial state in the transmission+print job may be arranged as the immediate start mode, not as the waiting mode.

In step S129, CPU 11 extracts the approver information from the electronic watermark information stored in RAM 14, and stores the approver information by correlating to said job in nonvolatile memory 15 (Step S129). Further, CPU 11 stores the user information of the present login user (user ID, name, etc.) by correlating to said job, in nonvolatile memory 15 (Step S130).

Figure 14:
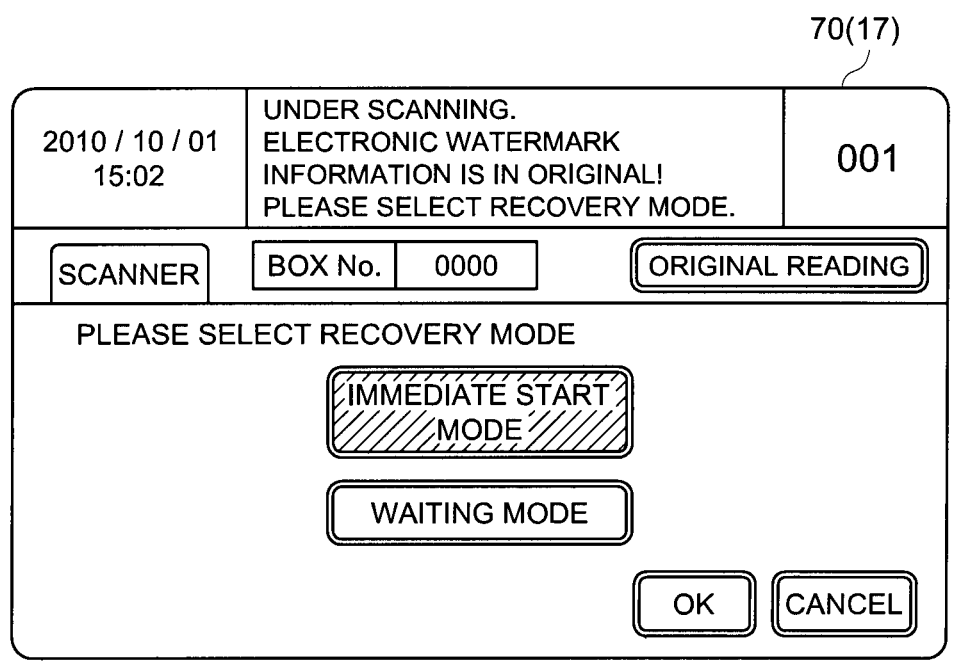
FIG. 14 is a diagram showing an example of recovery mode selection screen displayed on a display section of the MFP.

CPU 11 monitors if recovery mode selection is received from the user through the recovery mode selection screen displayed on display section 17 (Step S131; No). FIG. 14 shows an example of recovery mode selection screen 70.

In recovery mode selection screen 70, mode selection buttons respective to immediate start mode and waiting mode are displayed. In FIG. 14, mode selection button being selected is shown with hatching, and immediate start mode is indicated as selected state.

If agrees with the default recovery mode (immediate start mode or waiting mode), the user presses the OK button in the screen to determine the recovery mode. In case of changing, the user presses the selection button of non-selected state to switch the recovery mode, and by pressing the OK button, determines change/selection of the recovery mode. In cases of canceling said approval requiring job, presses the cancel button.

Figure 10:
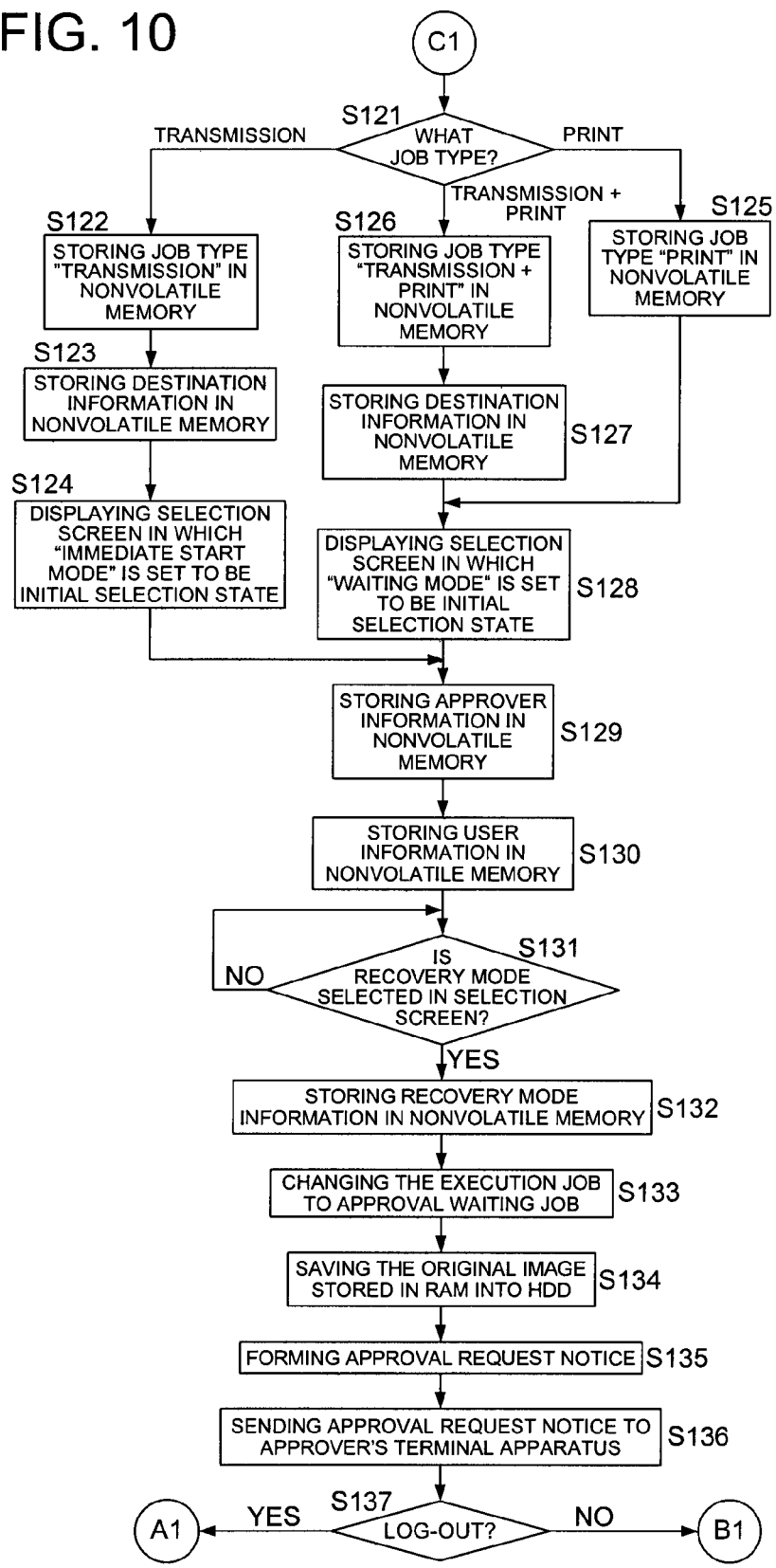
FIG. 10 is a flow chart (2/4) showing a flow continuing from S111 (Yes) of FIG. 9.

In FIG. 10, when receives the determination of recovery mode selection via the recovery mode selection screen (Step S131; Yes), CPU 11 stores recovery mode information indicating the selected recovery mode, by correlating to the said job, in nonvolatile memory 15 (Step S132).

Subsequently, CPU 11 changes the said job (execution job) to an approval waiting job (Step S133), and saves the image data of the original document relating to said job stored in RAM 14 into hard disc device 16 from RAM 14 (Step S134). This save storage is performed by copying the image data stored in RAM 14 onto hard disc device 16, and after the copying, deleting said image data from RAM 14.

Subsequently, CPU 11 forms an approval request notice mail by using the various type of information (job type, transmission destination information, approver information, user information, and recovery mode information) and the job ID (job No.) attached to said job (Step S135). After forming said notice mail, CPU 11 deletes the electronic watermark information stored in RAM 14, and transmits the approval request notice mail to administrator terminal 35 of the approver indicated by the approver information (Step S136). Then, in case of receiving a logout operation from the user (Step S137; Yes), the flow returns to S101, and in case of not receiving a logout operation (Step S137; No), returns to S104.

Details of the approval request notice mail have been described by FIGS. 3, 5 and 7. When the approver using administrator terminal 35 receives the approval request notice mail, the approver confirms the approval request notice mail through administrator terminal 35, forms the above described approval result notice mail (approval notice mail/rejection notice mail, FIGS. 4a-b, 6a-b, 8a-b), and sends a reply from administrator terminal 35 to MFP 10.

In case of receiving the approval result notice mail from administrator terminal 35, MFP 10 moves from (Step S103; Yes) to Step S141, and executes the steps of S141 and after.

In Step S141, CPU 11 stores the received approval result notice mail into nonvolatile memory 15. Further, based on the user information described in this received approval result notice mail, CPU 11 transfers the approval result notice mail stored in nonvolatile memory 15 to user terminal of the user (Step S142).

Subsequently, CPU 11 confirms the information described in "approval status" in approval notice column of the approval result notice mail (Step S143). In cases where "rejected" is described (Step S143; rejection, at the time of receiving the rejection notice mail), CPU 11 determines that the approval for the approval waiting job relating to said notice mail cannot be obtained. In this case, CPU 11 deletes the various type of information (job type, transmission destination information, approver information, user information, and recovery mode information) relating to the approval waiting job, and the approval result notice mail relating to the job, and deletes the image data of the original document relating to the job (Step S144), then return to Step S101.

In cases where "approved" is described (Step S143; approved, at the time of receiving the approval notice mail), CPU 11 determines that the approval for the approval waiting job relating to said notice mail has been obtained, and changes the approval waiting job to an approved waiting job. Then, confirms the job type of said job (the job changed from approval waiting state to approved waiting state) stored in nonvolatile memory 15 (Step S145).

In cases where the job type is "print" or "transmission" (Step S145; No), moves to Step S150. In cases where the job type is "transmission+print" (Step S145; Yes), confirms the job type information described in "job type" of the approval notice column in the approval result notice mail (Step S146). In cases where the job type is "transmission+print" (Step S146; Yes), CPU 11 confirms that the job type described in the approval result notice mail agrees with the job type "transmission+print" stored in nonvolatile memory 15, not having been changed by the approver, and moves to Step S150.

In cases where the job type information described in "job type" of the approval notice column in the approval result notice mail is "print" (Step S146; No→Step S147; Yes), CPU 11 confirms that the approver changed the job type to be "print" (approved only "print"), changes said job (approved waiting job) from the job at the time of setting "transmission+print" job to "print" (Step S148), and moves to Step S150.

In cases where the job type information described in "job type" of the approval notice column in the approval result notice mail (Step S146) is "print" (Step S146; No→Step S147; No), CPU 11 confirms that the approver changed the job type to be "transmission" (approved only "transmission"), changes said job (approved waiting job) from the job at the time of setting "transmission+print" job to "transmission" job (Step S149), and moves to Step S150.

In step 150, CPU 11 confirms the recovery mode information described in "recovery mode" of the approval notice column in the approval result notice mail (Step S150). In cases where this recovery mode is "waiting mode" (Step S150; waiting mode), returns to Step 101 in FIG. 9. In case of "immediate start mode" (Step S150; immediate start mode), moves to Step 154 in FIG. 12 (details will be described later).

In FIG. 9, CPU 11 searches if the approval result notice mail for the logged-in user exist in nonvolatile memory 15, and in cases where a relevant approval result notice mail exists (Step S104; Yes), moves to S151 in FIG. 12. In Step S151, CPU 11 displays the notice screen of approved waiting job, and subsequently displays the selection screen of approved waiting job (Step S151).

Figure 15:
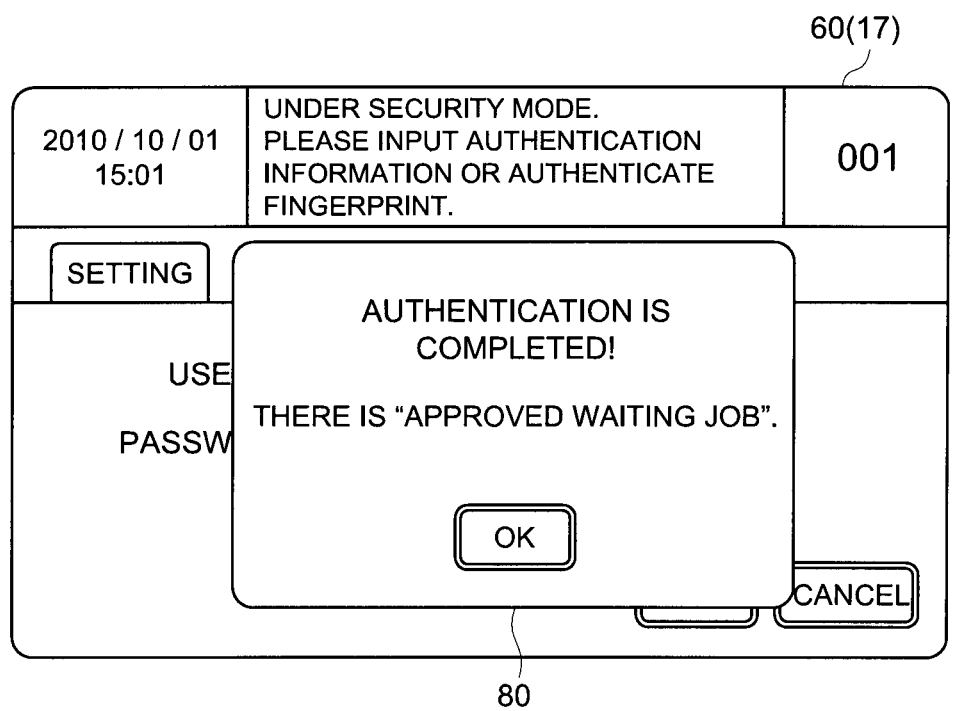
FIG. 15 is a diagram showing an example of approved waiting job notice screen displayed on a display section of the MFP.
Figure 16:
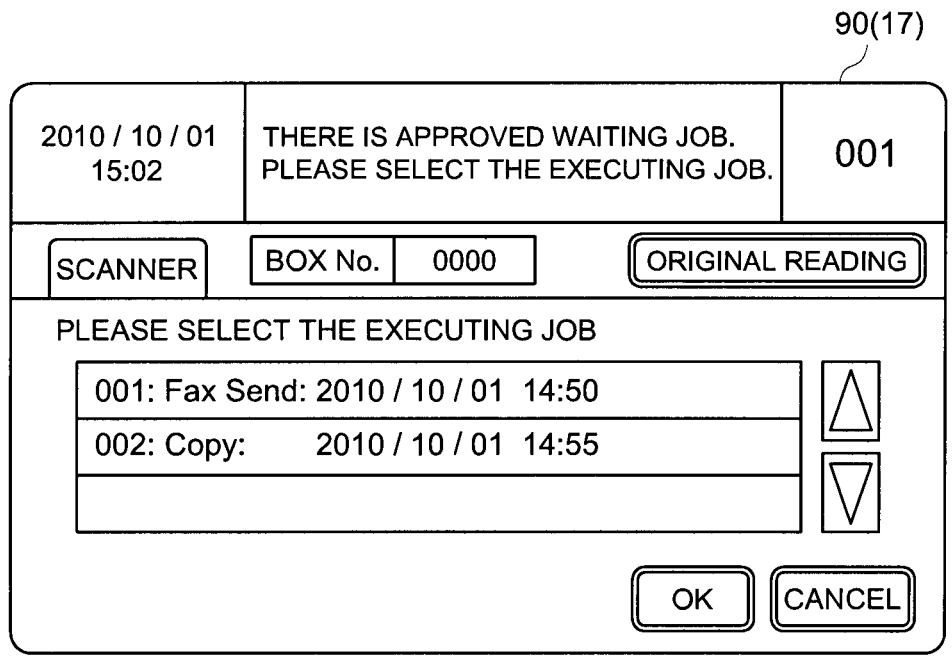
FIG. 16 is a diagram showing an example of approved waiting job selection screen displayed on a display section of the MFP.

FIG. 15 shows an example of the approved waiting job notice screen 80. The approved waiting job notice screen 80 is popup displayed in a pop-up window on login screen 60. FIG. 16 shows the approved waiting job selection screen 90. In the approved waiting job selection screen 90, a list of approved waiting job relating to the logged-in user is displayed.

Figure 12:
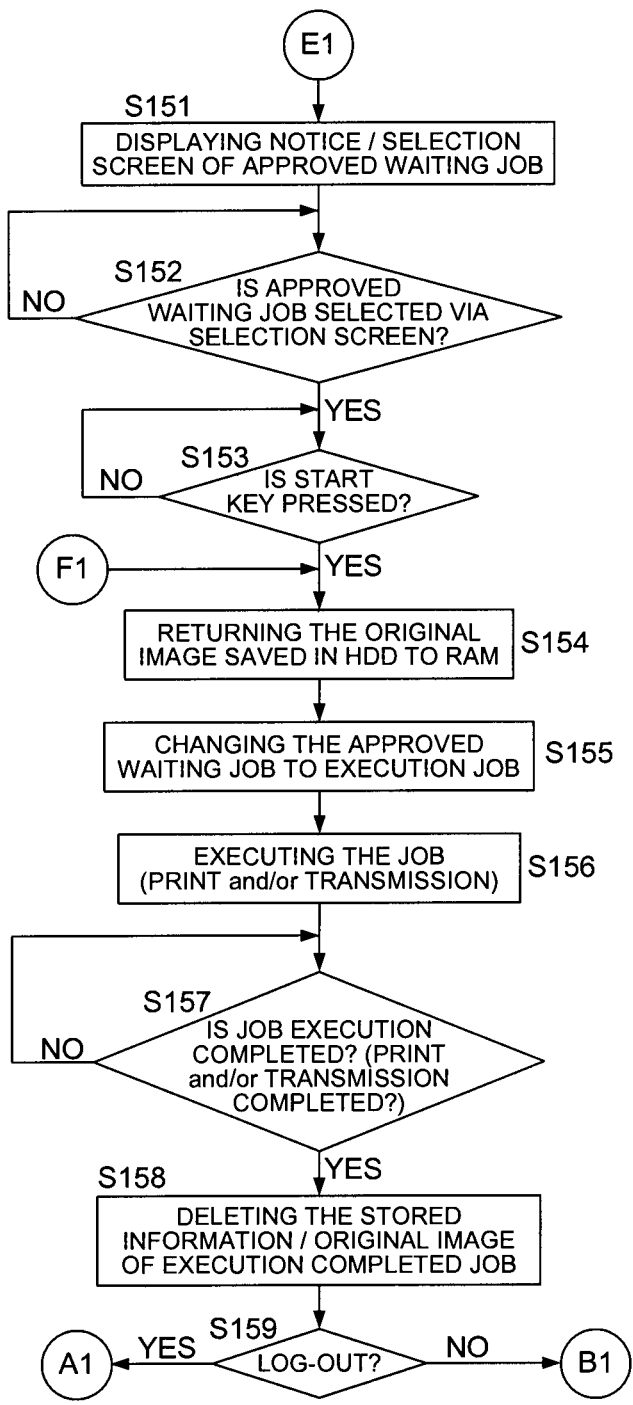
FIG. 12 is a flow chart (4/4) showing a flow continuing from S104 (Yes) of FIG. 9.

In FIG. 12 CPU 11 monitors if receives the selection of approved waiting job via the approved waiting job selection screen (Step S152). In case of receiving the selection of approved waiting job (Step S152; Yes), CPU 11 monitors if receives the pressing of start key (Step S153). In case of receiving the pressing of start key (Step S153; Yes), CPU 11 returns the image data of the original document relating to the selected approved waiting job saved in hard disc device 16 to RAM 14 (Step S154).

Figure 11:
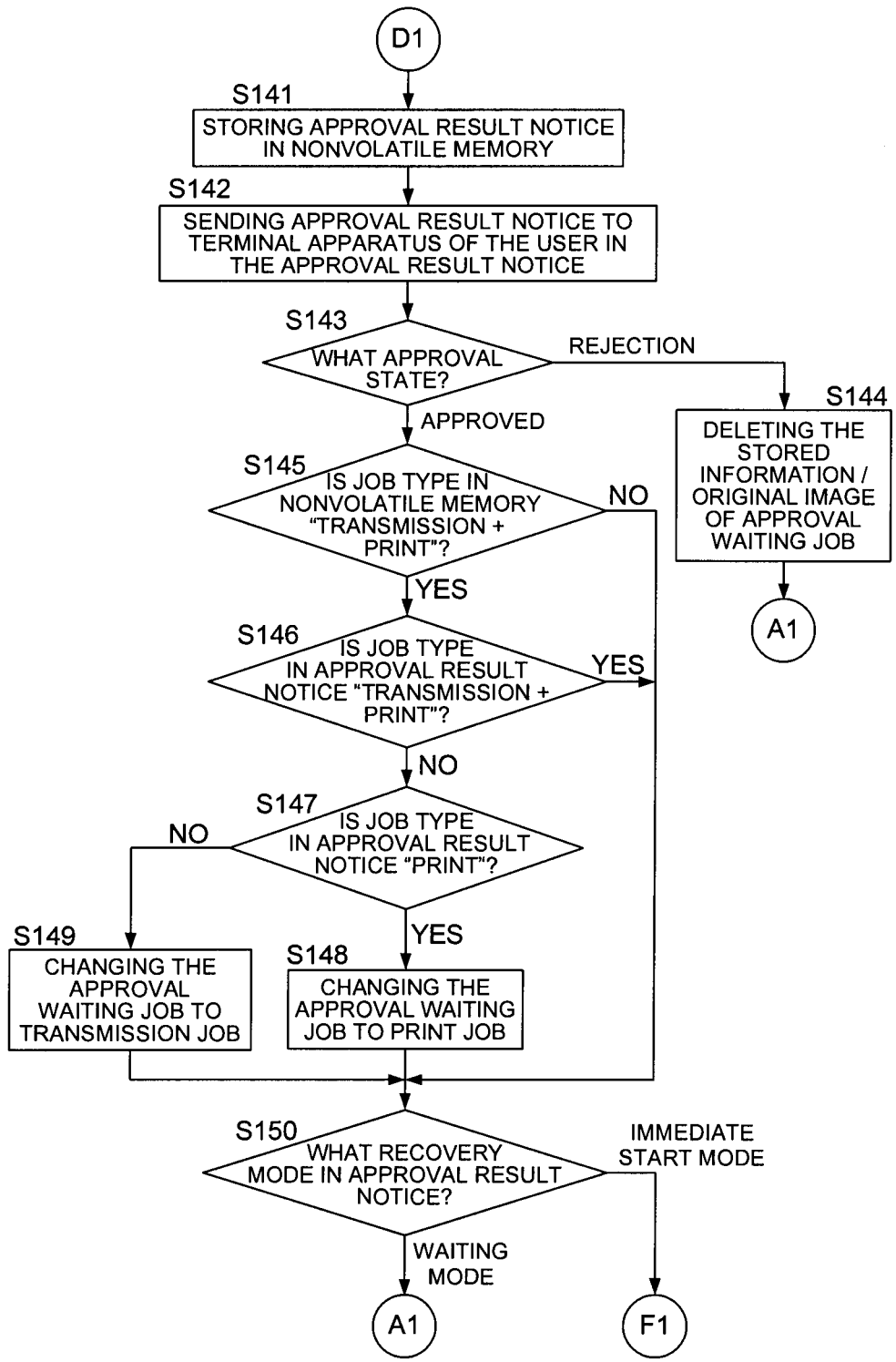
FIG. 11 is a flow chart (3/4) showing a flow continuing from S103 (Yes) of FIG. 9.

Further, in cases where, in Step S150 of FIG. 11 the recovery mode according to the approval result notice mail received from administrator terminal 35 and stored in nonvolatile memory 15, is "immediate start mode", steps of Step S154 and after in FIG. 12 are executed. In this case, CPU 11 identifies the approved waiting job corresponding to the received/stored approval result notice mail, and returns the image data of the original document relating to said specified approved waiting job saved in hard disc device 16 to RAM 14 (Step S154).

The returning of the image data from hard disc device 16 to RAM 14 is executed by copying the image data saved in hard disc device 16 onto RAM 14, and after the copying, deleting the image data from hard disc device 16.

CPU 11 changes the approved waiting job selected via the approved waiting job selection screen, or the approved waiting job corresponding to the approval result notice mail to an execution job (Step S155), and executes the job (Step S156→Step S157; No). Since the content of Step S156 is similar to that of Step 112 of FIG. 9, the detailed explanation will be omitted.

When completing the job execution, (Step S157; Yes), CPU 11 deletes the various type of information (job type, transmission destination information, approver information, user information, and recovery mode information) relating to said job stored in nonvolatile memory 15, and the approval result notice mail relating to the job, and further deletes the image data of the original document relating to the job stored in RAM 14 (Step S158). Then, in case of receiving a logout operation from the user (Step S159; Yes), the flow returns to S101, and in case of not receiving a logout operation (Step S159; No), returns to S104.

Here, although examples of copy and/or transmission of the original document are described, a print job and/or a transmission job received from user terminal 30 can be also similarly executed. Namely, in cases where MFP 10 determines the job (print/transmission) received from user terminal 30 as the job requiring an approval for outputting the image, makes the job in approval waiting status, and require the approval for outputting the image of said job from the approver. In case of obtaining the approval from the approver, it is possible to switch whether to execute the job with immediate start mode or with waiting mode, according to the output mode (print/transmission) of said job.

Further in case of determining the job received from user terminal 30 to be required of approval, and receiving the selection of recovery mode (immediate start mode or waiting mode) via said user terminal 30 from the user, MFP 10 communicates with user terminal 30, displays the recovery mode selection screen similar to that exemplified in FIG. 14, and enables to receive the recovery mode selection from the user via the screen.

According to the process relating to the present embodiment shown in FIGS. 9-12, the initial setting (default) recovery mode (immediate start mode/waiting mode) is proposed to the user according to the job attribute (output mode/job type), and acceptance/change of the recovery mode is received, however the change of the recovery mode may be configured not to be received. Further, the approval request notice mail is sent by attaching the recovery mode, and change of the recovery mode from the approver is made to be received via the approval result notice mail, however, the change of the recovery mode by the approver may be configured not to be received. Further, the approval request notice mail is sent by attaching the job type (output mode/job attribute), and change of the job type from the approver is made to be received via the approval result notice mail, however the change of the job type by the approver may be configured not to be received. Namely, without receiving the selection of the selection of recovery mode by the user, or the designation of recovery mode and job type (job attribute) by the approver, the recovery mode may be configured to be automatically switched to the initial setting recovery mode according to the attribute of the job received from the user.

In this case, in the approval request notice mail shown in FIGS. 3, 5 and 7, the items of "job type" and "recovery mode" in the approval notice column are omitted, and in the approval result notice mail (FIGS. 4a,b, 6a,b, and 8a,b) to be received from the approver, the designation (or change) of job type or recovery mode is configured not to be accepted. Further, recovery mode selection screen 70, shown in FIG. 14, to receive the recovery mode selection is substituted to a recovery mode informing screen to inform an initial setting recovery mode according to the job attribute. In Step S124 and Step S128 of FIG. 10, "selection screen" is substituted to "informing screen" and Step S131 is deleted. In Step S150 of FIG. 11, CPU 11 does not confirm the recovery mode information described in "recovery mode" of approval notice column in the received approval result notice mail, but confirm the recovery mode information, stored in nonvolatile memory 15, of the job (approval waiting job) corresponding to the received approval result notice mail. By the above described change and substitution, the recovery mode can be automatically switched to the initial setting mode according to the attribute of the job received from the user.

As described above, MFP 10 relating to the present embodiment, in cases where the job accepted by the job reception section is a job that requires an approval for outputting the image, makes the job under an approval waiting state, and transmits an approval request notice (approval request notice mail) to a prescribe approver. In case of receiving an approval notice (approval notice mail) indicating the approval from the approver with respect to outputting the image by the job requiring of the approval via the approval request notice, switches whether to execute a first execution operation (job execution operation by the immediate start mode to immediately start the job execution) that automatically executes the job, or to execute a second execution operation (job execution by the waiting mode to execute the job after receiving the execution instruction operation from the user) that executes the job after receiving an execution instruction operation, according to the outputting mode of the job (job type).

In detail, regarding the transmission type job, in case of receiving the approval notice from the approver, MFP 10 switches the recovery mode to immediate start mode and automatically executes the job. In case of transmission, since confidentiality of output material depends on the output condition at the side of receiver, the confidentiality at the time of output is not different between the case of automatically transmitting from the transmission side (MFP 10 side) after obtaining the approval and the case of transmitting by receiving the execution instruction operation. Further, regarding the print type job, in case of receiving the approval notice from the approver, MFP 10 switches the recovery mode to waiting mode, and executes the job after receiving the execution instruction operation. In case of printing, the confidentiality of output material at the time of outputting is kept higher in the case of executing the job by receiving the execution instruction operation than the case of automatically executing after obtaining the approval. Level of confidentiality is different between the transmission and the print, and it may be said that the level of confidentiality is higher in the transmission than the print (the case of printing is lower in confidential level than the case of transmitting).

Due to the above, start timing of the approval waiting job after the approval can be automatically switched to an appropriate timing considered of ensuring security and quick processing according to the output mode of the job (job type). Therefore, setting operation for this switching is made unnecessary, and load of operation is diminished.

Regarding the transmission type job which is not different in confidentiality between the case of receiving and not receiving the execution instruction operation, by automatically executing the job after obtaining the approval, useless operation can be omitted to improve convenience. Further, regarding the print type job which becomes higher in confidentiality at outputting by executing the job after receiving the execution instruction operation, the security can be ensured by not automatically executing the job, and executing the job after receiving the execution instruction.

Further, with respect to the approval requiring job, in case of receiving the selection instruction regarding whether to execute the job with immediate start mode or with waiting mode after receiving the approval (user selection of recovery mode), switching to the selected recovery mode is executed. Due to this, the execution mode in the case of executing the approval waiting job after receiving the approval is enabled to be selected by each job.

In the present embodiment, the recovery mode (immediate start mode/waiting mode) of initial (default) setting is identifiably presented for the user, and agreement/change (user selection) of the initial setting recovery mode is received, however, it may be configured such that direct selection of desired recovery mode (immediate start mode/waiting mode) from the user is accepted without presenting the initial setting.

Further, in the approval notice for the job requiring the approval in the approval request notice (image output by the approval waiting job), the approver can change whether to execute the job after the approval with immediate start mode or with waiting mode, by the authority of the approver. In case of receiving the change in recovery mode by the approval notice received from the approver, MFP 10 places priority on the change and switches to the changed recovery mode. Due to this, the approver is enabled to change the recovery mode of executing the approval waiting job after the approval, by each job.

In the present embodiment, the agreement/change for the recovery mode (approver's designation) is accepted in cases where the approver deletes one of "immediate start mode" or "waiting mode" described at "recovery mode" in the approval notice column of approval request notice mail, however, the configuration to accept direct designation of the recovery mode approved from the approver may be possible. For example, by describing to the effect that either of "immediate start mode" or "waiting mode" is acceptable as the item of "recovery mode" in the approval request content of the approval request notice mail, and transmits to the approver with making the item of "recovery mode" blank. The approver describes such as "immediate start" or "waiting" as the item of "recovery mode" in the approval notice column of the approval result notice mail to be formed as the reply mail to the approval request notice mail, thus the designation of recovery mode is enabled.

Further, in the approval notice for the job (transmission+print job in the present embodiment) requiring of approval by the approval request notice, the approver can change the output mode (job type) of said job by the authority of the approver. In case of receiving the change of output mode via the approval notice received from the approver, MFP 10 changes the output mode of the job based on the received change. Due to this, the approver is enabled to change the output mode of executing the approval waiting job after the approval, by each job.

In the present embodiment, the agreement/change for the job type (approver's designation) is accepted in cases where the approver deletes one of job type information ("transmission+print", "transmission" or "print") described at "job type" in the approval notice column of approval request notice mail, however, the configuration to accept direct designation of the job type approved from the approver may be possible. For example, by describing to the effect that either of "transmission+print" or "transmission" is acceptable, or "transmission+print" or "print" is acceptable, as the item of "job type" in the approval request content of the approval request notice mail, and transmits to the approver with making the item of "job type" blank. The approver describes such as "transmission+print", "transmission" or "print" as the item of "job type" in the approval notice column of the approval result notice mail to be formed as the reply mail to the approval request notice mail, thus the designation of job type is enabled.

Further, MFP 10 save the job data in approval waiting status (image data of the original document) from RAM 14, which temporarily stores the job data at the time of executing the job, to hard disk device 16. This enables to prevent accumulation of the approval waiting job data in RAM 14. In case of executing the job not requiring the approval, its job data is temporarily stored in RAM 14, and Ram 14 is effectively used to execute the processing.

Further, regarding the job for executing copy or transmission of the original document, in cases where prescribed information (such as electronic watermark and RFID) is attached to the original document, MFP 10 automatically determines that the job requires of approval for outputting. For example, regarding the original on which confidential information and the like is described, by previously attaching prescribed information on the original document, the outputting of the image obtained by reading the original document is automatically made to be an approval requiring job, which ensures security for outputting the job.

Subsequently, in the second to fourth embodiments, actual operation of MFP 10 for a storage type job will be described.

The Second Embodiment

As the jobs that MFP receives through user's operation, there are jobs such as a job to store the original document image into MFP 10 or into an external memory connected to MFP 10, a job to store the image stored in MFP 10 into an external memory, and a job to store the image stored in the external memory into MFP 10. Among these jobs, the job to store the original document image into MFP 10 is a scan-to-box job for storing a scanned image (file) of the original document into a box (image storage folder) set up in hard disc device 16 of MFP 10. The job for storing the scanned image (file) of the original document into the external memory connected to MFP 10 is a scan-to-USB job for storing the scanned image of the original document into a USB memory or the like connected to MFP 10.

FIG. 17 and FIGS. 18a,b show examples of the approval request notice mail (44) that MFP 10 transmits to administrator terminal 35, and the approval result notice mail (54a, 54b) that MFP 10 receives from administrator terminal 35, for the storage type job.

In these notice mail relating to the storage type job, configuration of described contents (described items), and approval method by the approver (method of approval and method of changing the approval content) are similar to the notice mail shown in FIGS. 3-8 relating to the print type job and the transmission type job. A different point in the specific described contents is that "job type" becomes "storage". As for the "recovery mode", same as the transmission type job, "immediate start mode" is configured to be automatically selected in initial (default) setting. Here, as described in recovery mode selection screen 70 exemplified in FIG. 14, this automatically selected recovery mode can be changed by the user.

In approval request notice mail 44 of FIG. 17, an example is shown where "immediate start mode" is selected as the "recovery mode". In the approval result notice mail 54*a* shown in FIG. 18*a*, an example is shown where "immediate start mode" is approved by the approver as the "recovery mode", and in the approval result notice mail 54*b* shown in FIG. 18*b*, an example is shown where "waiting mode" is approved by the approver as the "recovery mode".

Further, in FIGS. 19*a*,*b* and 20*a*,*b*, variant examples of notice mail relating to the print type job and storage type job are shown.

FIGS. 19*a* and 19*b* respectively show variant examples of approval request notice mail 45 and approval request notice mail 55. These examples are the notice mails with respect to the job for executing the storage as well as the print of image (such as copy of original document). In approval request notice mail 45, as the "job type" of the approval notice column, "print" and "storage" are described, which shows the notice mail requires the approval for print and storage. In "recovery mode", "waiting mode" is described without parentheses, which shows that "waiting mode" is selected, and "immediate start mode" is described in parentheses, which shows that "immediate start mode" is not selected.

In approval result notice mail 55 for this approval request notice mail 45, as the "job type" in the approval notice column, only "print" is described ("storage" is deleted), which shows that only the print is approved As the "recovery mode", only "waiting mode" is described ("immediate start mode" described in parentheses is deleted), which shows that the waiting mode is approved.

FIGS. 20*a*, 20*b* show the variant example of approval request notice mail 46 and approval result notice mail 56 relating to the storage type job. This example is the notice mail for the job for executing the print in addition to the storage of image (such as scan and storage of the original document). In approval request notice mail 46, as the "job type" in the approval notice column, "print" and "storage" is described, which shows the notice mail requests the approval for print and storage. In "recovery mode", "waiting mode" is described without parentheses, which shows that "waiting mode" is selected, and "immediate start mode" is described in parentheses, which shows that "immediate start mode" is not selected.

In approval result notice mail 56 for this approval request notice mail 46, as the "job type" in the approval notice column, only "storage" is described ("print" is deleted), which shows that only the storage is approved. As the "recovery mode", only "waiting mode" is described ("immediate start mode" described in parentheses is deleted), which shows that the waiting mode is approved.

FIGS. 21-24 are flow charts showing operations of job execution relating to the second embodiment. In the present operations, the transmission type job is replaced to the storage type job, with respect to the flows in FIGS. 9-13 described in the first embodiment. Here, the same step No. is given to the step of basically same processing content as the first embodiment, and its explanation is omitted. The step of mainly different processing content (step of added, deleted, or partly different in processing content even with same step No.) will be described.

Figure 21:
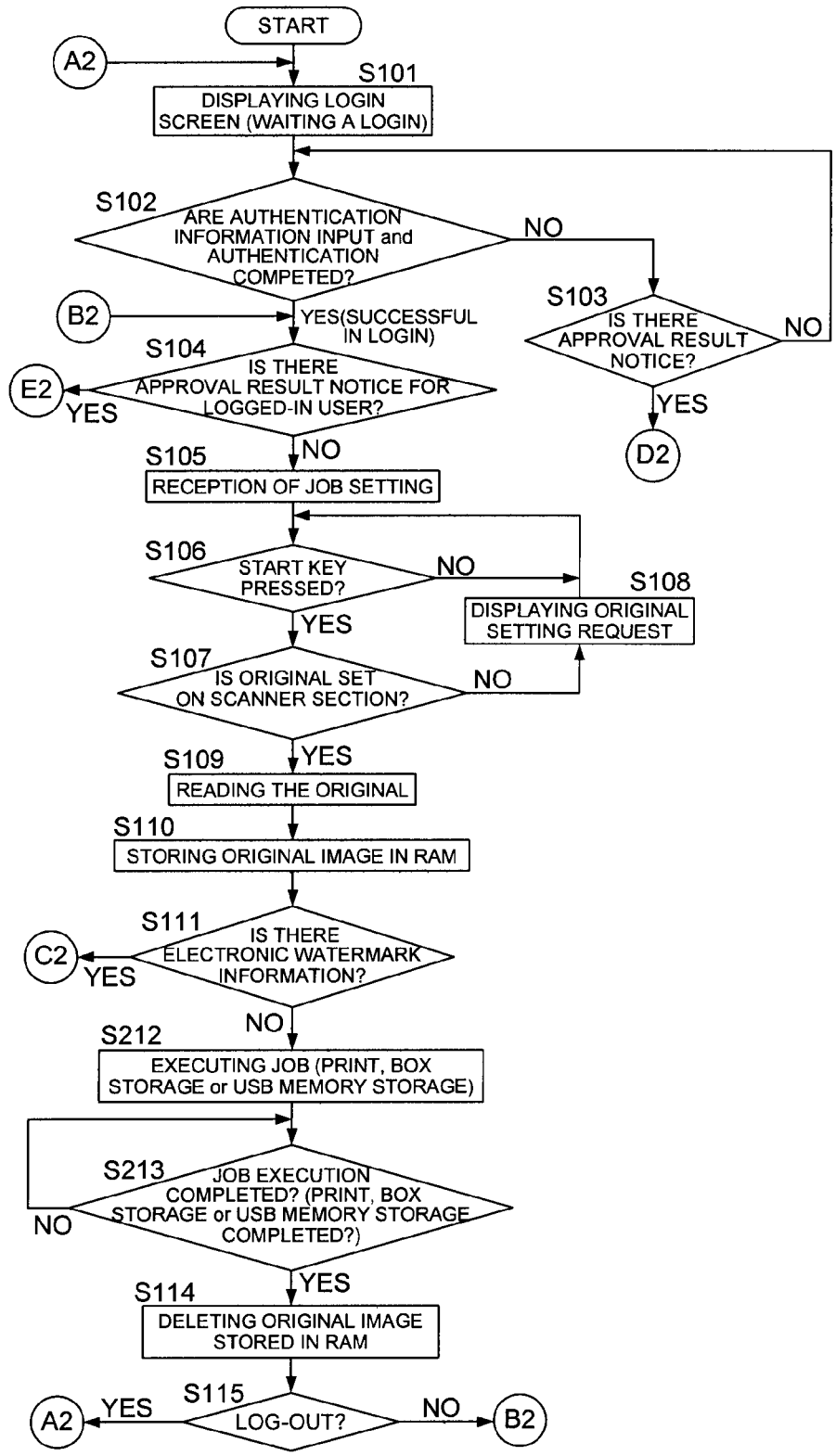
FIG. 21 is a flow chart (1/4) showing a flow of job execution operation by the MFP relating to the second embodiment of the present invention.

In FIG. 21, CPU 11 of MFP 10 receives a job setting from a user in Step S105. Here, CPU 11 receives, via operation section 18, the setting of original document copying (duplication print) job, job of storing the original document scanned image into a BOX (hard disc device 16) in MFP 10 (BOX storage job), or job of storing the original document scanned image into a USB memory connected to external memory connector 24 (USB memory storage job).

In cases where reading of all original document is completed, and there is no electronic watermark information in any page the image data (Step S111; No), CPU 11 execute said job as a normal job (Step S212-Step S213; No). With respect to the normal job, the image data relating to said job is printed or stored (BOX storage/USB storage) according to the setting contents.

Figure 22:
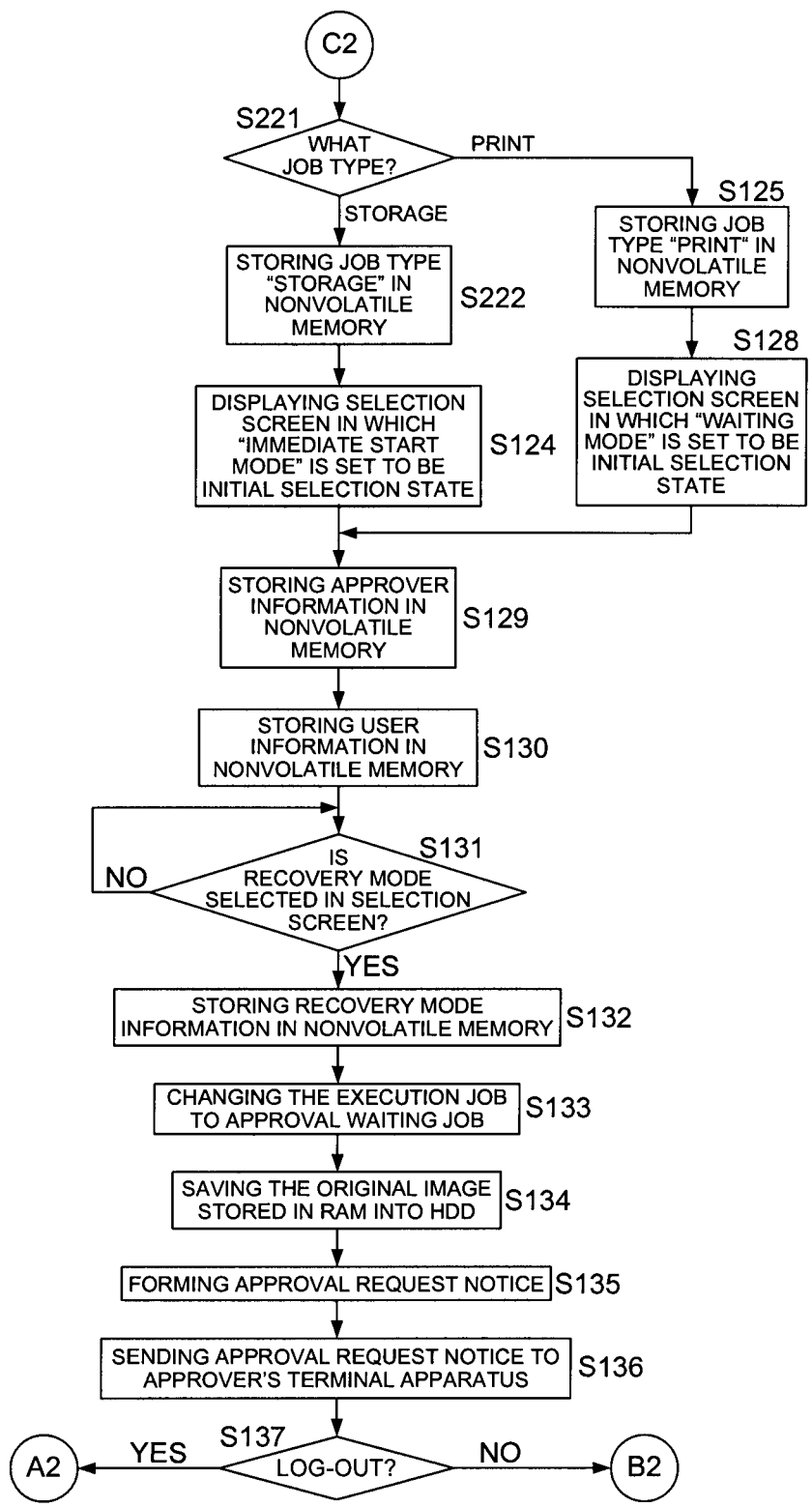
FIG. 22 is a flow chart (2/4) showing a flow continuing from S111 (Yes) of FIG. 21.

In Step S221 of FIG. 22, CPU 11 confirms the job type of said job. In case of job type being print (Step S221; print), same as the first embodiment, CPU 11 stores "print" indicating the job type of said job by correlating to said job in nonvolatile memory 15 (Step S125). And, by displaying the recovery mode selection screen in which waiting mode is set to be the initial selection state, on display section 17 (Step S128), moves to Step S129.

In case of job type being storage (Step S221; storage), CPU 11 stores "storage" indicating the job type of said job by correlating to said job in nonvolatile memory 15 (Step S222). And, by displaying the recovery mode selection screen in which immediate start mode is set to be the initial selection state, on display section 17 (Step S124), moves to Step S129.

Figure 23:
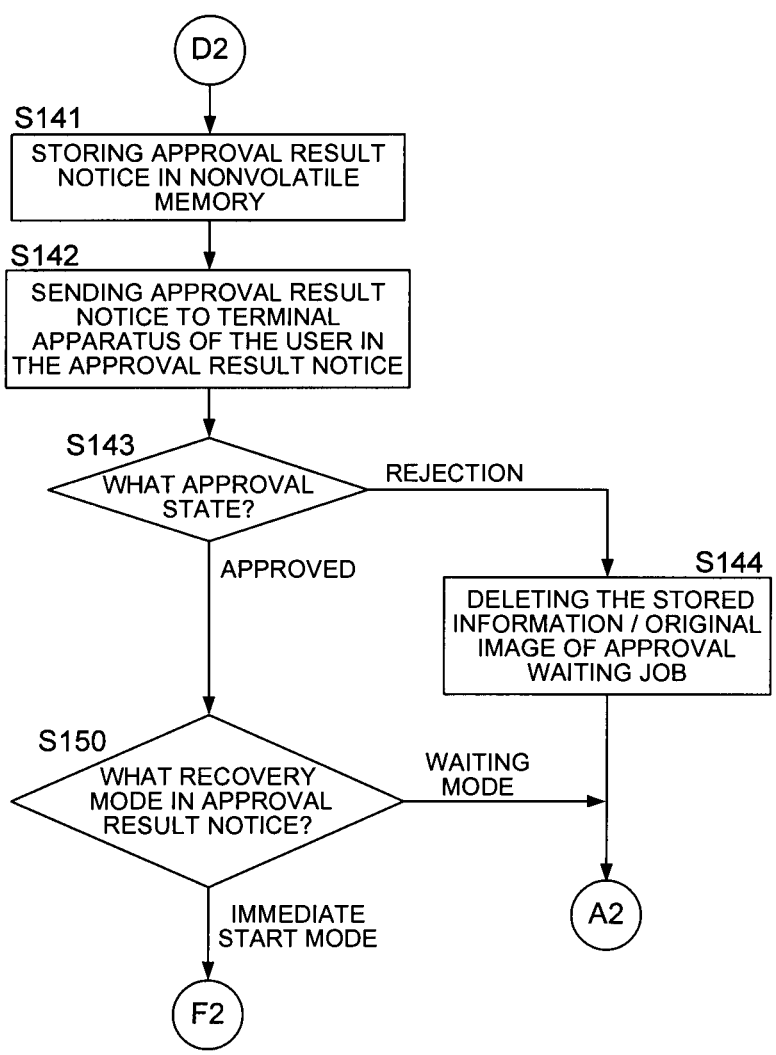
FIG. 23 is a flow chart (3/4) showing a flow continuing from S103 (Yes) of FIG. 21.

In Step S143 of FIG. 23, CPU 11 confirms the information described in "approval status" in approval notice column of the approval result notice mail. In cases where "approved" is described (Step S143; approved, at the time of receiving the approval notice mail), CPU 11 determines that the approval for the approval waiting job relating to said notice mail has been obtained, and changes the approval waiting job to an approved waiting job.

Subsequently, CPU 11 confirms the recovery mode information described in "recovery mode" in approval notice column of the approval result notice mail (Step S150). In case of the recovery mode being "waiting mode" (Step S150; waiting mode), the flow returns to Step S101 of FIG. 21. In case of the recovery mode being "immediate start mode" (Step S150; immediate start mode), the flow, moves to Step S154 of FIG. 24.

Figure 24:
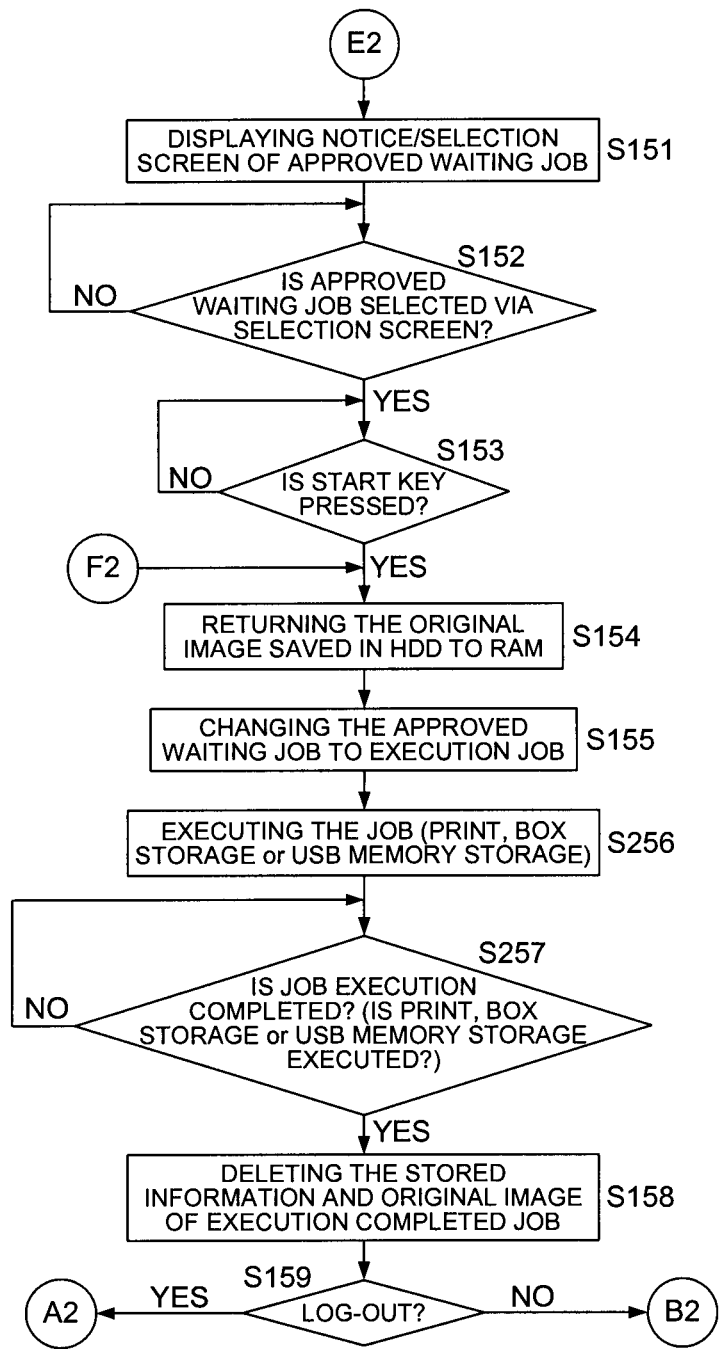
FIG. 24 is a flow chart (4/4) showing a flow continuing from S104 (Yes) of FIG. 21.
Figure 25:
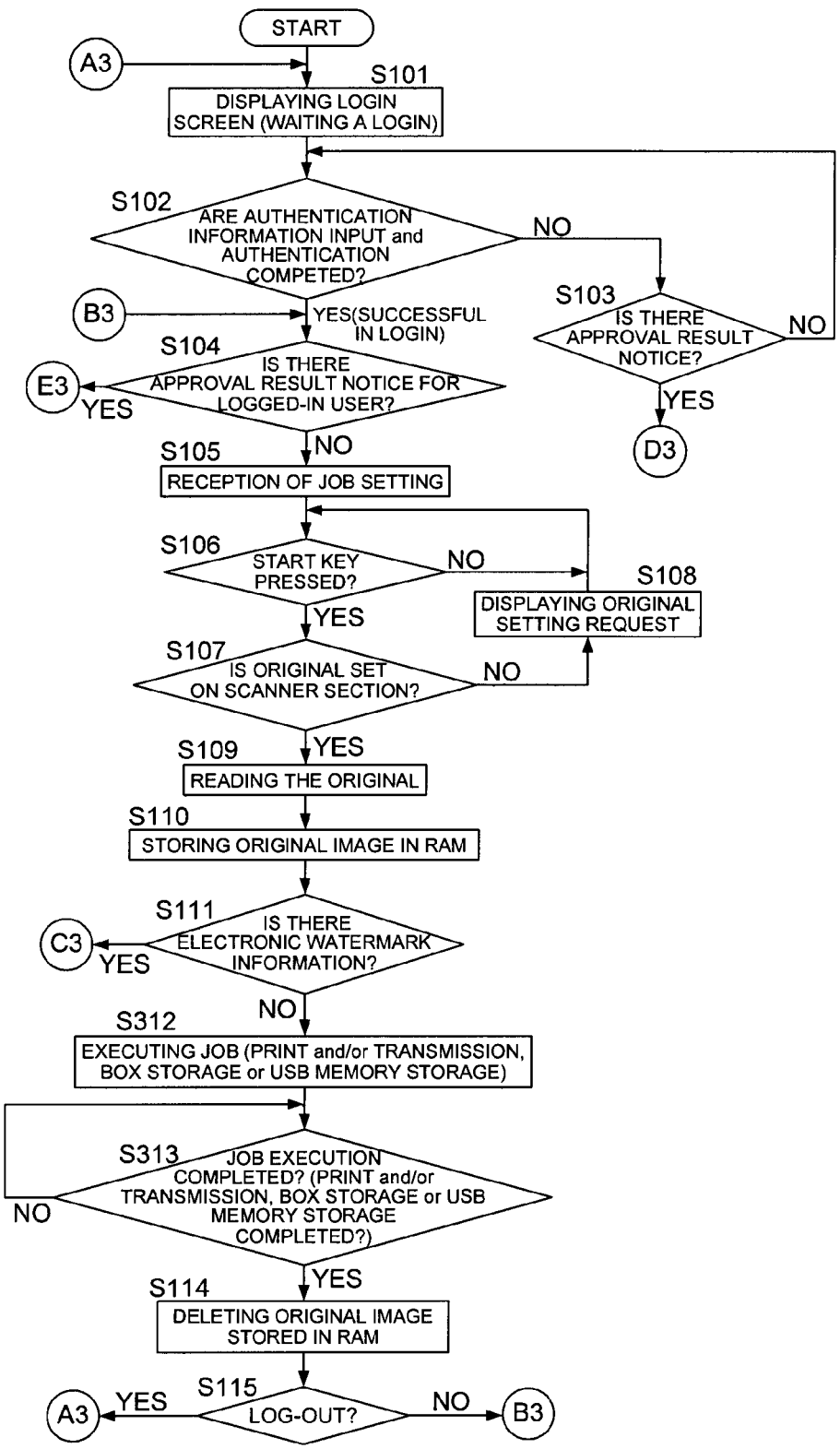
FIG. 25 is a flow chart (1/4) showing a flow of job execution operation by the MFP relating to the third embodiment of the present invention.
Figure 26:
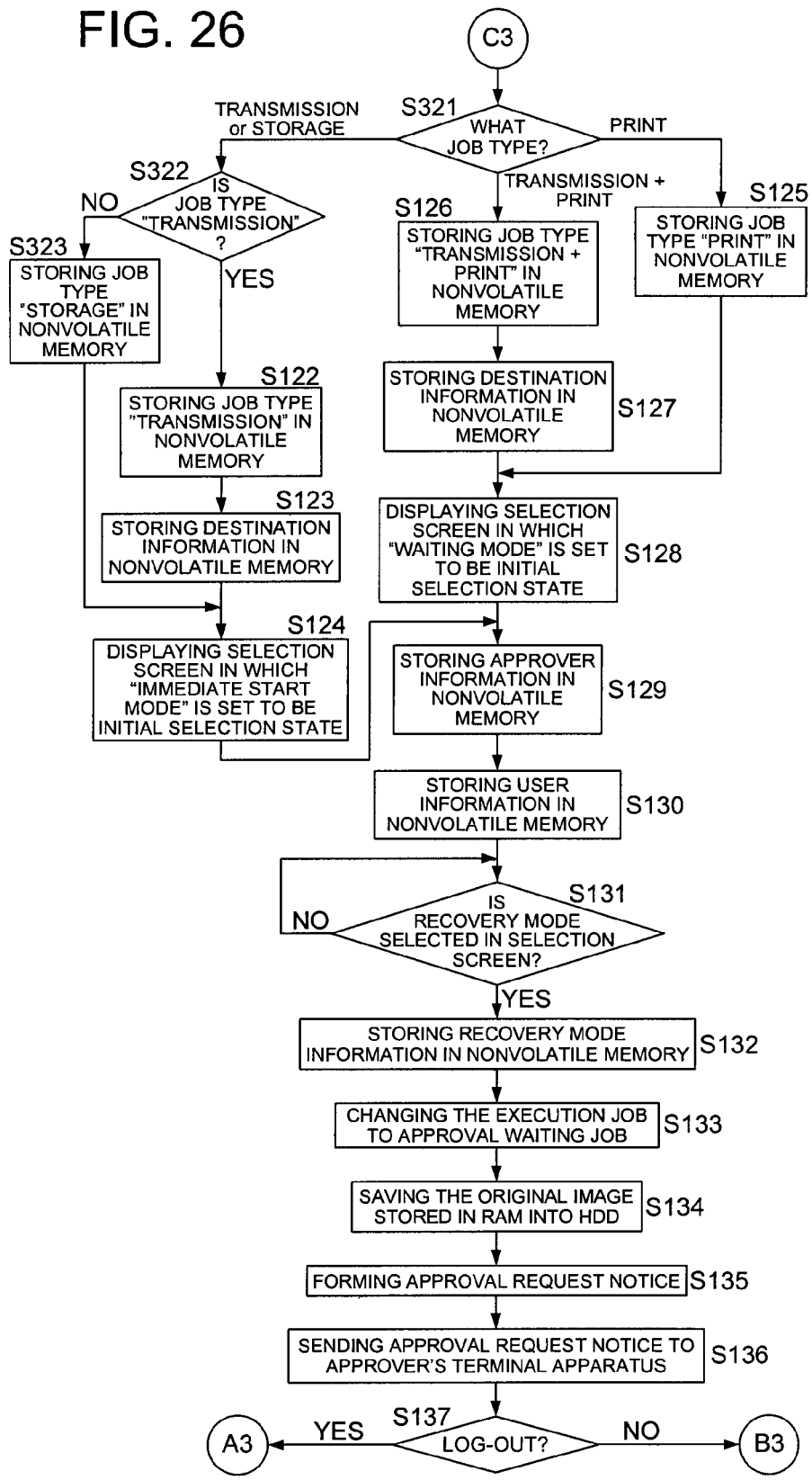
FIG. 26 is a flow chart (2/4) showing a flow continuing from S111 (Yes) of FIG. 25.

In FIG. 24, CPU 11 changes the approved waiting job selected via the approved waiting job selection screen, or the approved waiting job corresponding to the approval result notice mail to an execution job, and executes the job (Step S256→Step S257; No). The content of Step S256 is similar to that of Step 212 of FIG. 21.

As described above, start timing of the approval waiting job of print type and storage type after the approval can be automatically switched to an appropriate timing in consideration of ensuring security and quick processing according to the output mode of the job (job type). Therefore, setting operation for this switching is made unnecessary, and load of operation is diminished.

Further, in the job of storing the image in BOX (hard disc device 16) of MFP 10, the confidentiality at the time of output is not different between the case of automatically storing after obtaining the approval and the case of storing by receiving the execution instruction operation. Further, regarding the image storing job into the USB memory connected to MFP 10, if controlled such that anyone else cannot handle the USB memory by strictly storing the USB memory, or by applying a password lock, the confidentiality at the time of output is not different between the above cases.

In this way, since the storage type job, similarly to the transmission type job, is not different in confidentiality between the case of receiving and not receiving the execution instruction operation, by automatically executing the job after obtaining the approval, the user's operation of execution instruction by moving to MFP 10 is made unnecessary and useless operation can be omitted to improve convenience.

The Third Embodiment

FIGS. 25-28 are flow charts showing operations of job execution relating to the third embodiment. The present operations encompasses the job operations of print type job and transmission type job explained in the first embodiment and the job operations of storage type job explained in the second embodiment.

Figure 27:
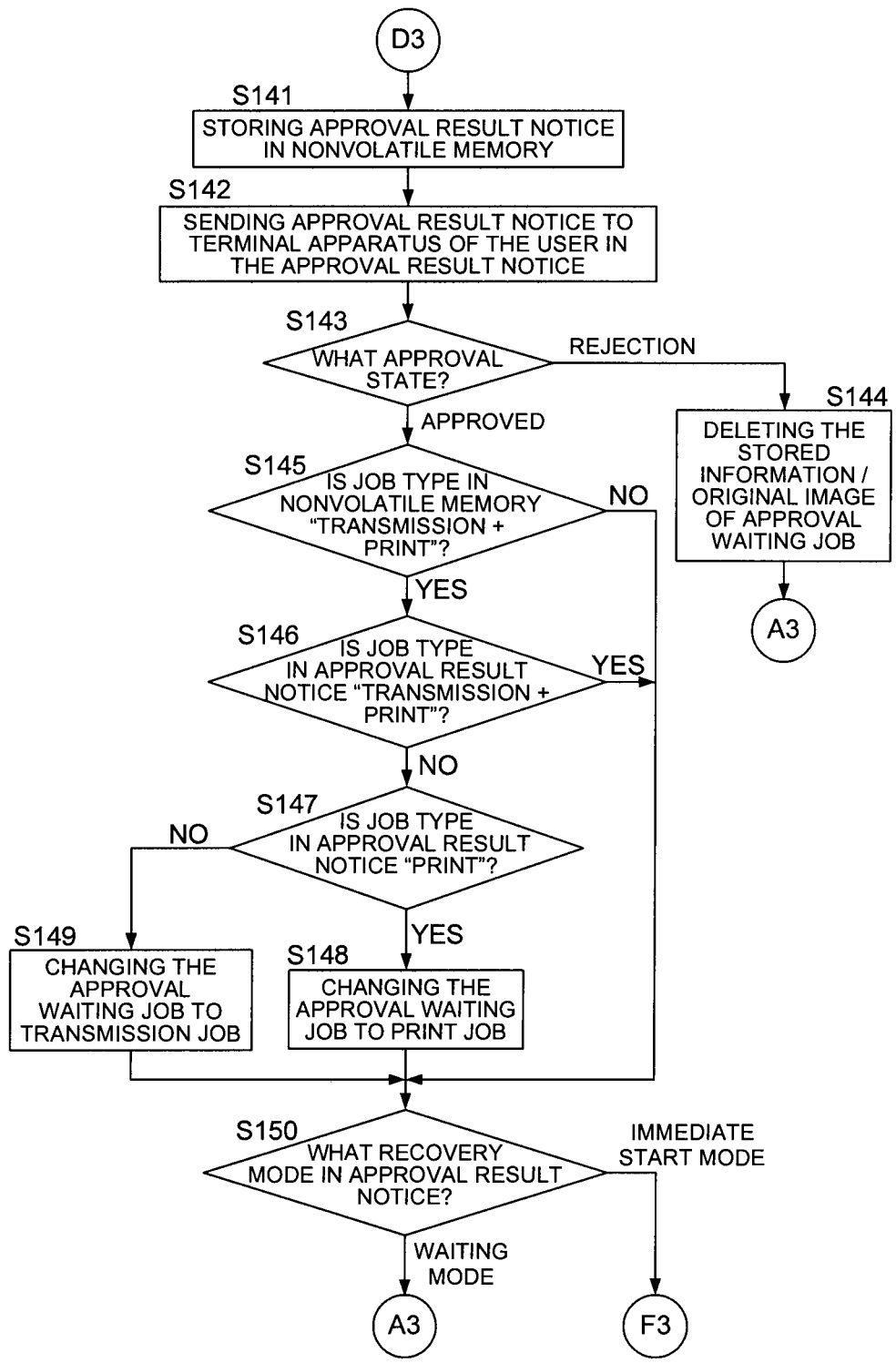
FIG. 27 is a flow chart (3/4) showing a flow continuing from S103 (Yes) of FIG. 25.
Figure 28:
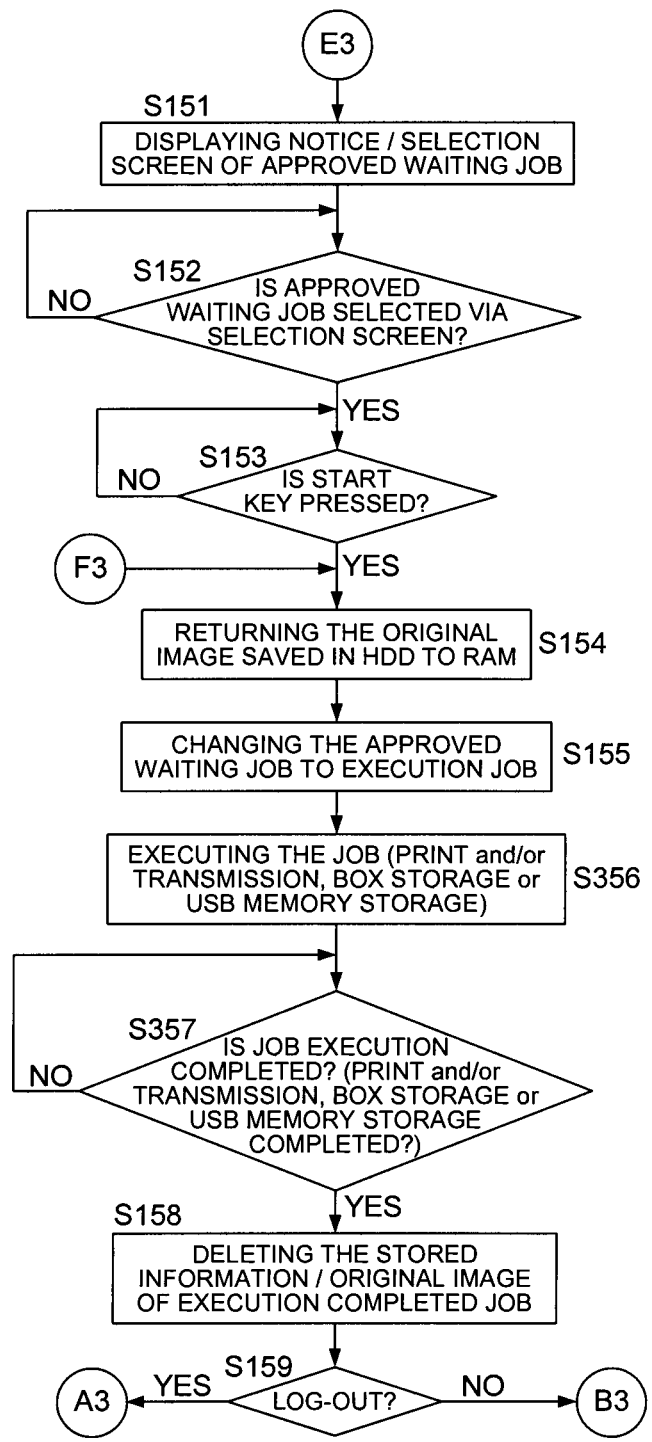
FIG. 28 is a flow chart (4/4) showing a flow continuing from S104 (Yes) of FIG. 25.

Respective processing steps of FIGS. 25-28 relating to the present embodiment are basically the steps combined with respective processing steps of FIG. 9-13 relating to the first embodiment and respective processing steps of FIG. 21-24 relating to the second embodiment. The different steps from FIGS. 9-12 and FIGS. 21-24 are Steps S312 and S313 relating to the job execution of FIG. 25, Steps S321, S322 and S3323 relating to the determination of job type information and the storage into nonvolatile memory 15, and Steps S356 and S357 relating to the job execution of FIG. 28. Each processing step of FIG. 27 is same as the one of FIG. 11.

Since the respective processing steps of FIGS. 25-28 are the steps integrated the respective steps explained in the first and second embodiments, the details of the processing contents are described above and will be omitted here.

The Fourth Embodiment

FIGS. 29-32 are flow charts showing operations of job execution relating to the third embodiment. The present operations are a variation example for the operations of print type job and storage type job explained in the second embodiment.

In the present embodiment, in order to enhance the security for the storage type job, with respect to the job required of approval for storing the image (the storage job for the image attached with electronic watermark information), said image is encrypted and stored. In cases of receiving a job execution instruction to print the encrypted and stored image, by making the job in the approval waiting state, CPU 11 transmits the approval request notice mail (refer to FIG. 17) to the prescribed approver (administrator terminal 35). In cases of receiving the approval result notice mail (refer to FIG. 18) indicating the approval (agreement) from the approver, CPU 11 allows the execution of the job and prints the image by decrypting.

Here, the same step No. is given to the step of basically same processing content as the first and second embodiments, and its explanation is omitted. The step of mainly different processing content (step of added, deleted, or partly different in processing content even with same step No.) will be described.

Figure 29:
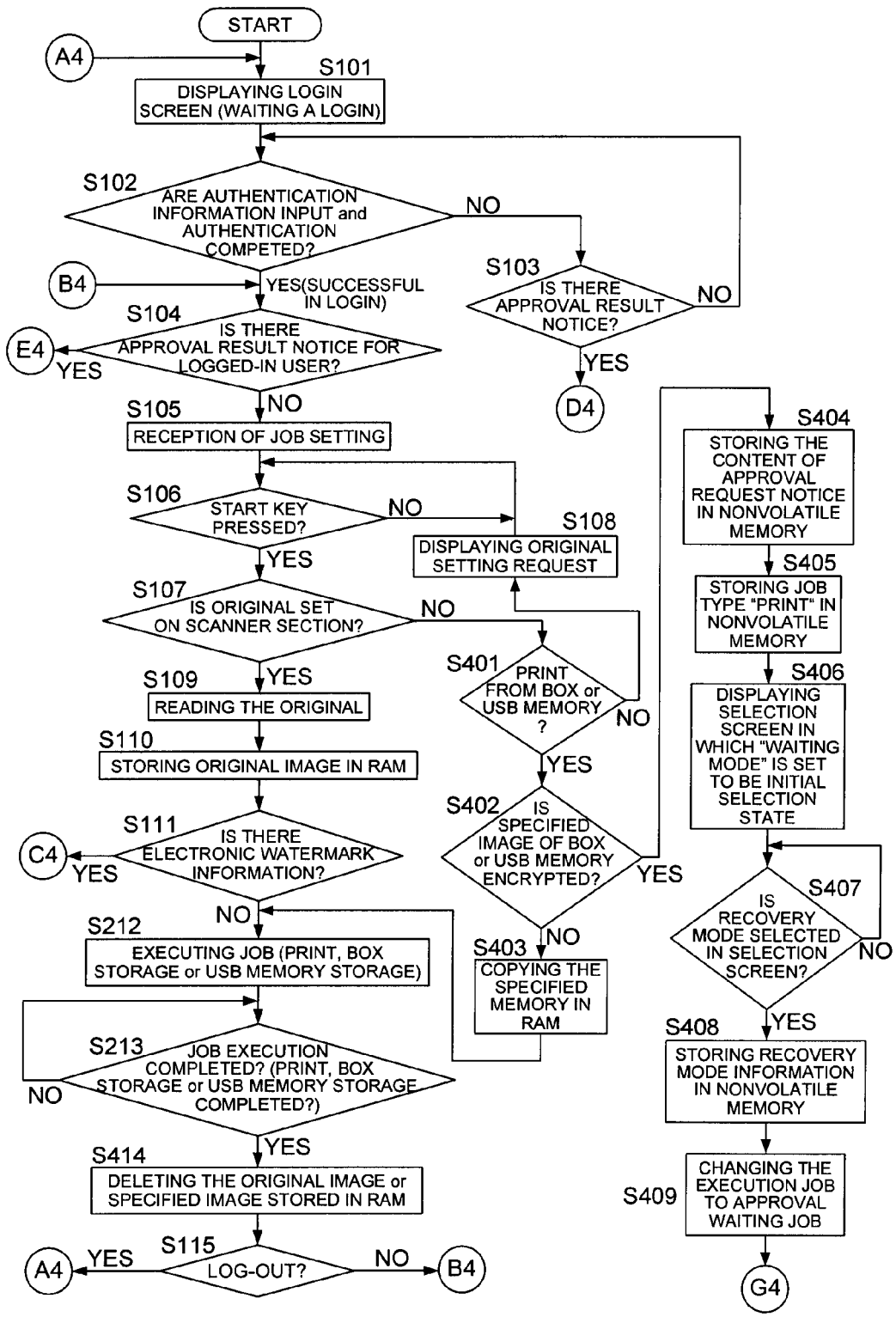
FIG. 29 is a flow chart (1/4) showing a flow of job execution operation by the MFP relating to the fourth embodiment of the present invention.

In FIG. 29, CPU 11 of MFP 10 receives a job setting from a user in Step S105. Here, CPU 11 receives, via operation section 18, the setting of original document copying (duplication print) job, the job of storing the original document scanned image into a BOX (hard disc device 16) in MFP 10 (BOX storage job), the job of storing the original document scanned image into a USB memory connected to external memory connector 24 (USB memory storage job), the job for specifying and printing the image stored in the BOX of MFP 10, or the job for specifying and printing the image stored in the USB memory connected to external memory connector of MFP 10.

In cases where, CPU 11 receives a job execution instruction with the start key being pressed (Step S106; Yes), and does not detect an original document at scanner section 21 (Step S107; No), and if said job, received of execution instruction, is not the job of copy, BOX storage, or USB memory storage, the flow moves to the Step S108. Then, in order to urge a warning to the user, displaying a message to the effect of requiring original setting such as "Please set original document" on display section 17 (Step S108), and the flow returns to Step S106 to be the start key press waiting state.

In cases where the job having received the execution instruction is the job for specifying and printing the image stored in the BOX or USB memory (Step S401; Yes), CPU 11 confirms if the specified image (file of the image data) is encrypted or not (Step S402). In cases where the specified image is not encrypted (Step S402; No), by copying the specified image in RAM 14 (Step S403), CPU 11 executes the job of printing the image in RAM 14 (Step S212, S213; No).

Upon completing the job execution (Step S213; Yes), CPU 11 deletes the image stored in RAM 14 relating to the job (Step S414).

On the other hand, in cases where the specified image is encrypted (Step S402; Yes), CPU 11 stores the content of approval request notice for the printing of said specified image, by correlating to said job (job ID), in nonvolatile memory 15 (Step S404), and stores "print" indicating the job type of said job, by correlating to said job, in nonvolatile memory 15 (Step S405).

Details of the approval request notice includes the above mentioned approver information which is necessary for forming the approval request notice mail, user information (the presently logged-in user), and recovery mode information. These various types of information are correlated to the image (encrypted image data) stored in the BOX or USB memory in the Step S463 (to be described later) of FIG. 32, and stored in the BOX or USB memory which will be the storing destination of the image. Here, the various types of information (content of approval request notice) being stored in the BOX or USB memory by correlating to the specified image are stored in nonvolatile memory 15 by correlating to the job.

CPU 11 displays the recovery mode selection screen (refer to FIG. 14) in which waiting mode is set to be the initial selection state, on display section 17 (Step S406), and monitors if recovery mode selection is received from the user through the recovery mode selection screen (Step S407; No). In case of receiving the determination of recovery mode from the user via the recovery mode selection screen (Step S407; Yes), CPU 11 stores the recovery mode information indicating the selected recovery mode in nonvolatile memory 15 by correlating to said job (Step S408), changes said job (execution job) to be an approval waiting job (Step S409), and moves to S135 of FIG. 30.

In case of moving from Step S409 to Step S135, CPU 11 forms an approval request notice mail (Step S135) by using the various type of information (job type, approver information, user information, and recovery mode information) and the job ID (job No.), and transmits the approval request notice mail to administrator terminal 35 of the approver indicated by the approver information.

Figure 31:
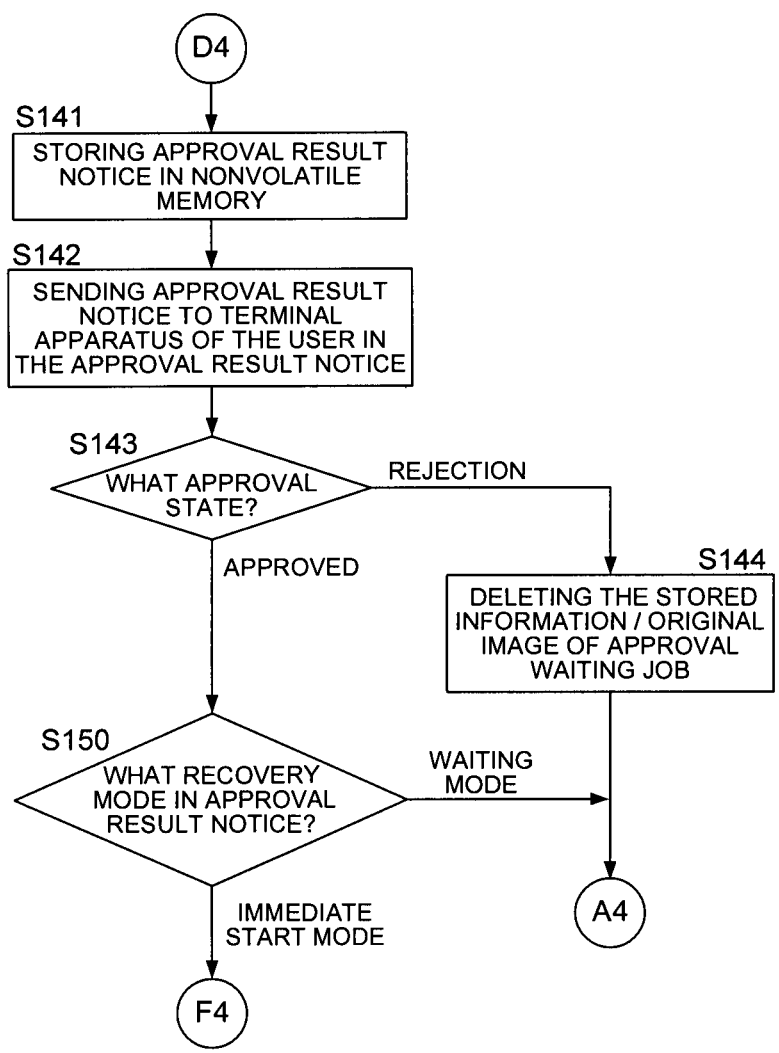
FIG. 31 is a flow chart (3/4) showing a flow continuing from S103 (Yes) of FIG. 29.

Since each processing step of FIG. 31 is same as each step of FIG. 23 explained in the second embodiment, the explanation will be omitted. However, in cases where the recovery mode, according to the approval result notice mail received from administrator terminal 35 and stored in nonvolatile memory 15, is "immediate start mode" (Step S150; immediate start mode), the flow moves to Step S451 of FIG. 32 (details will be described later).

Figure 32:
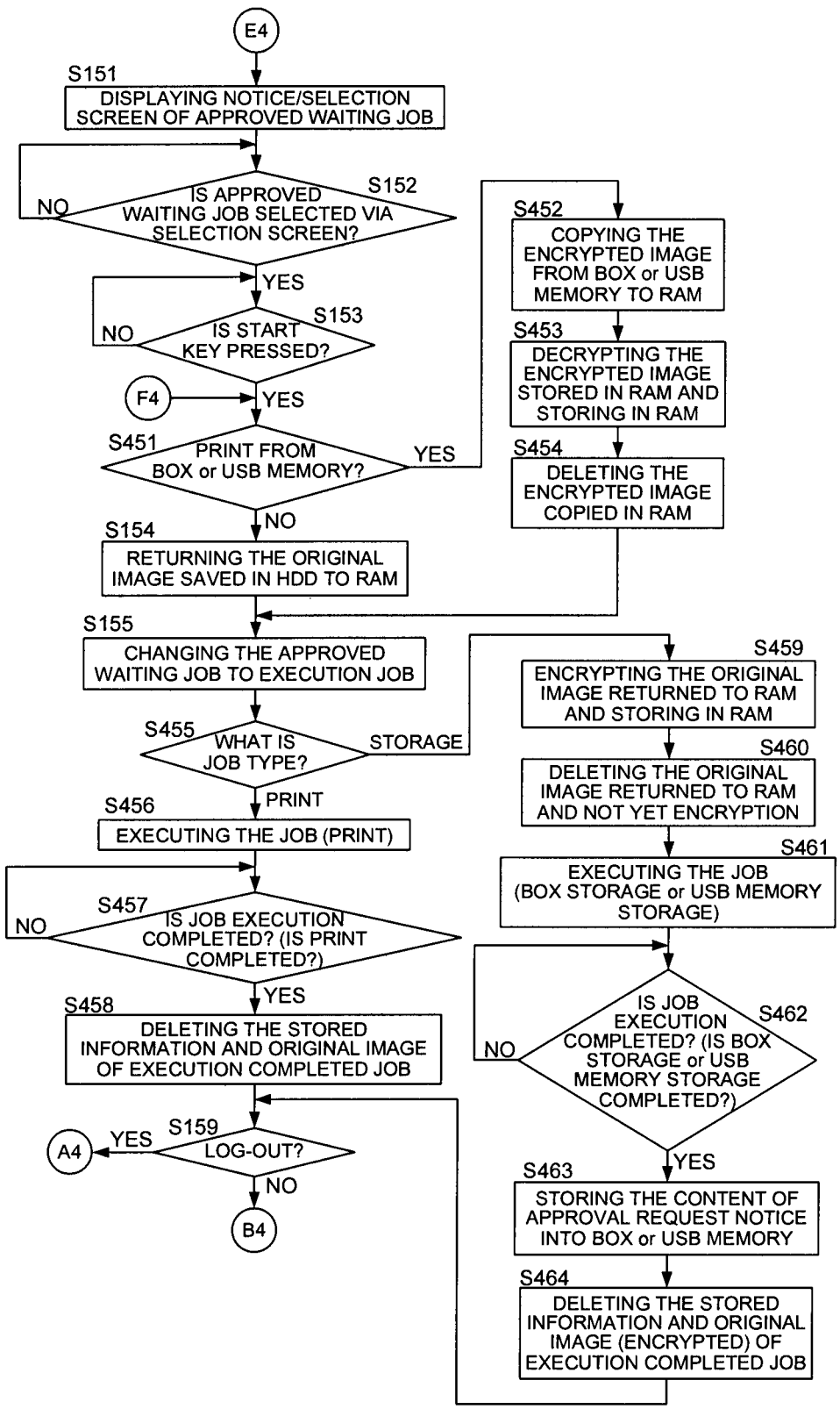
FIG. 32 is a flow chart (4/4) showing a flow continuing from S104 (Yes) of FIG. 29.

In FIG. 32, CPU 11 receives from the user the selection of approved waiting job via the selection screen of approved waiting job (refer to FIG. 16) displayed on display section 17 (Step S151, S152; Yes), and in case of receiving the press of start key (Step S153; Yes), if said job having received the selection and execution instruction is a copying job (Step S451; No), returns the original document image data saved in hard disc device 16 to RAM 14 (Step S154), and moves to Step S155.

In cases where the job having received the selection and execution instruction is a print job to print the specified image stored in the BOX or USB memory (Step S451; Yes), CPU 11 copies the specified image (encrypted image data) from the BOX or USB memory into RAM 14 (Step S452), and by decrypting the image, stores in RAM 14 (Step S453). And, by deleting the image (encrypted image data) having been copied in RAM 14 (Step S454), moves to Step S155.

In cases where, in Step S150 of FIG. 31, the recovery mode, according to the approval result notice mail received from administrator terminal 35 and stored in nonvolatile memory 16, is "immediate start mode", CPU 11 executes the Steps S451 and after in FIG. 32. In this case, if the approved waiting job corresponding to the received and stored approval result notice mail is a copying job (Step S451; No), CPU 11 executes the Steps S154 and after, and if said approved waiting job is a print job to print the specified image stored in the BOX of USB memory (Step S451; Yes), executes the Steps of S452 and after.

In Step S155, CPU 11 changes the approved waiting job selected via the approved waiting job selection screen or the approved waiting job corresponding to the approval result notice mail to an execution job (Step S155). In cases where this execution job is a copy or a print job to print the image stored in the BOX or the USB memory (Step S455; print), CPU 11 executes said job (Step S456→Step S457; No). Here, CPU 11 controls printer section 23 to print and output the image on a recording sheet based on the image data stored in RAM 14.

When completing the job execution, (Step S457; Yes), CPU 11 deletes the various type of information (job type, approver information, user information, and recovery mode information) relating to said job stored in nonvolatile memory 15, and the approval result notice mail relating to the job, and further deletes the image data (image data of the original document, or the copied and decrypted image data from the BOX or the USB memory) relating to the job stored in RAM 14 (Step S458), and moves to Step S159.

In cases where this execution job is a BOX storage job or a USB memory storage job (Step S455; storage), CPU 11 encrypts the original document image data, returned to RAM 14 from hard disc device 16 in Step S154, relating to said job, and stores in RAM 14 (Step S459), and further, deletes the original document image data before encryption from RAM 14 (Step S460).

Subsequently, CPU 11 executes said job to store the encrypted original document image data stored in RAM 14 into the BOX or USB memory (Step S461, S462; No).

Upon completing the job execution (Step S462; Yes), CPU 11 correlates the content of approval request notice relating said job having been stored in nonvolatile memory 15 to the image data (encrypted image data) stored in the BOX or the USB memory, and stores into the BOX or the USB memory (Step S463).

Details of the approval request notice includes the above mentioned approver information which is necessary for forming the approval request notice mail, user information (the presently logged-in user), and recovery mode information. These information will be necessary later, in case of printing the image data presently stored in the BOX or USB memory (refer to S401, S402, S404 in FIG. 29), for forming the approval request notice mail to obtain an approval for said printing. These various types of information are stored in Steps S129, S130, and S132 into nonvolatile memory 15, and in Step S463, these various types of information (content of approval request notice) are correlated to the image data having been encrypted and stored, and stored.

Figure 30:
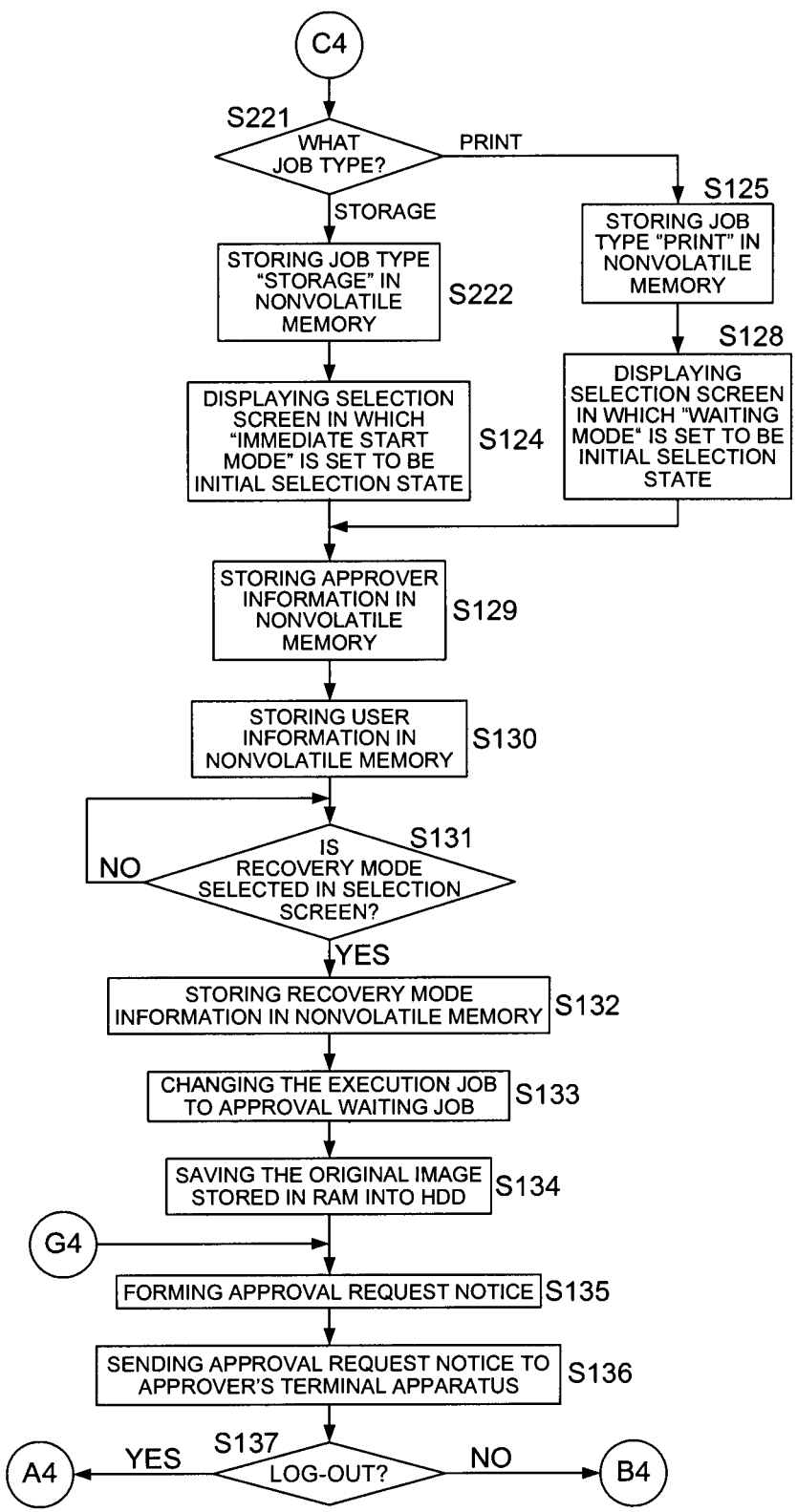
FIG. 30 is a flow chart (2/4) showing a flow continuing from S111 (Yes) of FIG. 29.

Wherein, since the job type to be described in the above approval request notice mail is "print", the job type information "print" having been stored in nonvolatile memory 15 in Step S222 of FIG. 30 is not necessary at the time of forming the above mail. Therefore, the job type information stored in nonvolatile memory is not included in the content of approval request notice, and accordingly, the storage of job type information correlated to the image data is not executed.

Subsequently, CPU 11 deletes the various types of information (job type, approver information, user information, recovery mode information) relating to the job, and the encrypted original document image data stored in RAM 14 relating to the job (Step S464), and moves to Step S159.

For instance, in cases where a user stores confidential information such as the original document image attached with the electronic watermark into the BOX or USB memory after obtaining the approval from the approver, if the user carelessly outputs said image (without obtaining approver's agreement), the image will be possibly viewed by anyone else, which is a problem. Further, in case of storing the image in the USB memory, if management of the USB is improper, as being possibly handled by anyone else, the image (confidential information) stored in the USB memory may be possibly viewed by anyone else, which is also a problem.

In the present embodiment, since the image is encrypted and stored in the BOX or USB memory, even if the user carelessly outputs the image or improperly manages the USB of storage destination, the image could not be viewed by anyone else, thus security is ensured.

Further, in cases of receiving the printing job of the encrypted image stored in the BOX or USB memory, MFP 10 makes said job in approval waiting state and transmits the approval request notice mail for image printing of the job to the prescribed approver. In cases of receiving the approval result notice mail indicating the approval of the image printing from the approver, MFP 10 allows the job execution and prints the image by decrypting.

Therefore, the printing job of the image encrypted and stored in the BOX or USB memory also becomes executable only in cases of obtaining the approver's agreement, and the careless output of the stored image by the user can be prevented from occurring.

Also, in the present embodiment, with respect to the above mentioned print job, it is possible for MFP 10 to automatically change to the waiting mode according to the output mode to execute the job, for the user to select the recovery mode (immediate start mode/waiting mode), or for the approver to change the recovery mode on his/her authority.

In the present embodiment, the case of printing the stored image is described, the output mode of the stored image may be the mode of transmission or storing to another memory (storage from a BOX into a USB memory, storage from a USB memory into a BOX, storage from a USB memory connected to MFP 10 into the other USB memory) and the like.

Further, with respect to the outputting job of the image stored in the BOX or USB memory, in case of executing the job after obtaining the approver's agreement, by switching between the immediate start mode to automatically execute the job and the waiting mode to execute the job after receiving the execution instruction operation, the execution start timing of the job after obtaining the approval can be automatically switched to an appropriate timing in consideration of ensuring security and quick processing.

In the above description, the embodiments of the present invention are explained referring to the drawings, specific configurations should not be restricted to those shown in the embodiments, without departing from the scope of the present invention, changes and additions are included in the present invention.

With respect to the job under the waiting state, the job attributes to be the decision factor for switching the execution mode after approval (recovery mode) are explained with examples of output modes (job types): print, transmission, and storage, however the other job attribute may be utilized.

For example, as the output mode in printing, there are a mode to output printed materials into sheet ejection tray, a mode to output into a locked box (security box) and the like. Outputting into the sheet ejection tray is a mode where the confidentiality at the time of outputting is higher in the case of printing after receiving the execution instruction operation than the case of automatically executing the printing after the approval (in automatic execution of printing, the output material is possibly viewed by a third person, which being low confidentiality level). In the mode of outputting into the locked box, the confidentiality at the time of outputting is unchanged between the case of automatically executing the printing after the approval and the case of printing after receiving the execution instruction operation (the possibility of the printed material being viewed by the third person is low, which being high confidentiality level). These plural types of output mode of printing different in confidentiality level may be used as the above described job attributes. In this case the configuration is possible where the job to output into a locked box is switched to the immediate start mode (first execution operation), and the job to output printed materials into sheet ejection tray is switched to the waiting mode (second execution operation).

As the output mode of transmission, there are a confidential transmission and a non-confidential transmission (regular transmission). The confidential transmission is the output mode whose confidentiality is unchanged between the case of automatic transmission after approval and the case of transmitting by receiving an execution instruction operation (possibility of outputted material being viewed by the third person is low, which being the output mode of high confidential level). The non-confidential transmission is the output mode whose confidentiality is higher in the case of transmitting after receiving the execution instruction operation (after notifying the receiver of the transmission start) than the case of automatic transmission after the approval (in the automatic transmission, the outputted material is possibly viewed by the third person, which being the output mode of low confidential level). These plural types of output mode of transmission different in confidentiality level may be used as the above described job attributes. In this case the configuration is possible where the job of confidential transmission is switched to the immediate start mode (first execution operation), and the job of non-confidential transmission is switched to the waiting mode (second execution operation).

Further, a job requiring a reservation may be accepted as a reserved job. In cases of the reserved job, for example, if the approval notice is received before reserved clock time, the execution of the reserved job may be automatically started when the reserve time comes, and if the approval notice is received after the reserved clock time, the reserved job may be automatically started immediately after receiving the approval notice. In this automatic execution of the reserved job, the job can be quickly executed without separately receiving the execution instruction operation.

An example is described above wherein, whether the job received from the user is the job requiring an approval for outputting the image or not is determined by whether prescribed information (electronic watermark information or RFID information) is attached on the original document or the image (file) of output object or not, however, a configuration of determining by the other condition is possible. For example, necessity of the approval may be determined based on job requiring user type (by each user type), and as for the transmission type job, the necessity of the approval may be determined by the type of destination of transmission (by destination information). In the case of determination based on the user type, the job of a low user level user may be determined to be required of approval, while the job of a high user level user or a manager may be determined to be not required of approval. In the case of determination based on destination information, for example, the job of transmission destination being outside the department or the company may be determined to be required of approval, while the job of transmission destination being inside the department or the company may be determined to be not required of approval.

As described in the above embodiments, the present image processing apparatus and image processing method include items below.

(1) An image processing apparatus including:
a job reception section which accepts a job to output an image;
a job execution section which executes the job accepted by the job reception section and outputs the image; and
a control section which, in cases where the job accepted by the job reception section is a job which requires an approval for outputting the image, makes the job under an approval waiting state, and transmits an approval request notice requiring the approval of an approver for outputting the image by the job, and in cases of receiving an approval notice indicating the approval for outputting the image by the job requiring the approval, switches whether to execute a first execution operation that automatically executes the job, or to execute a second execution operation that executes the job after receiving an execution instruction operation, according to an attribute of the job.

According to the above configuration, in cases where the accepted job is a job that requires an approval for outputting the image, the image processing apparatus makes the job under an approval waiting state, and transmits an approval request notice requiring the approval for outputting the image by the job to the approver. And, in cases of receiving an approval notice indicating the approval for outputting the image by said job, the image processing apparatus switches whether to execute a first execution operation that automatically executes the job, or to execute a second execution operation that executes the job after receiving an execution instruction operation, according to an attribute of the job.

Wherein, the automatic job execution by the first execution operation includes a job execution to execute the job without receiving the execution instruction operation, after receiving the approval. The automatic job execution includes, for example, an immediate start of regular job execution after receiving the approval, and a start of reserved job execution according to a reserved time (clock time) after receiving the approval.

Accordingly the image processing apparatus is capable of automatically switching the start timing, of the approval waiting job after receiving the approval, to be a proper timing in consideration of ensuring security and quick processing.

(2) The image processing apparatus described in item (1), wherein the job execution section has plural types of output mode, being different in confidentiality level with each other, for outputting the image, and wherein the job attribute to be a judgment factor for switching the execution operations is information identifying the output mode.

According to the above configuration, as the output mode for outputting the image, there are the plural types of output mode with different confidentiality levels. At the time of switching the execution operations (first execution operation/second execution operation) of the job under approval waiting state according to the attribute of the job, the image processing apparatus uses the information designating the output mode, as the job attribute to be the judgment factor. Accordingly, in case of executing the approval waiting job after the approval, the image processing apparatus automatically switches to the first execution operation or to the second execution operation according to the confidentiality level of the output mode.

(3) The image processing apparatus described in item (1), wherein the job execution section has, as output modes for outputting the image, a first output mode where the confidentiality level is unchanged between the case of automatically executing the approval waiting job after the approval and the case of executing the job by receiving an execution instruction operation, and a second output mode where the confidentiality becomes higher in the case of executing the approval waiting job by receiving an execution instruction operation after the approval than the case of automatically executing the job after the approval, wherein the job attribute to be a judgment factor for switching the execution modes is information identifying the output mode, and the control section switches to the first execution operation with respect to the job identified to be the first output mode, and to the second execution operation with respect to the job identified to be the second output mode.

According to the above configuration, in the first output mode job, the confidentiality at the time of outputting is unchanged between the case of automatically executing the job after the approval and the case of executing the job by receiving the execution instruction operation. With respect to the job whose confidentiality at the time of outputting is unchanged regardless of receiving or not receiving the execution instruction operation, by automatically executing the job without receiving the execution instruction operation after the approval, an unnecessary operation can be omitted and convenience is improved. In the second output mode job, the confidentiality at the time of outputting becomes higher in the case of executing the job by receiving the execution instruction operation than the case of automatically executing the job after the approval. With respect to the job whose confidentiality becomes high if executed by receiving the execution instruction operation, by not automatically executing, but by executing the job after receiving the execution instruction operation, the security is ensured.

(4) The image processing apparatus described in any one of items (1)-(3), wherein the job execution section has, as output modes for outputting the image, a first output mode where the confidentiality level is unchanged between the case of automatically executing the approval waiting job after the approval and the case of executing the job by receiving an execution instruction operation, and a second output mode where the confidentiality becomes higher in the case of executing the approval waiting job by receiving an execution instruction operation after the approval than the case of automatically executing the job after the approval, wherein the job attribute to be a judgment factor for switching the execution modes is information identifying the output mode, and the control section switches to the first execution operation with respect to the job identified to be the first output mode, and to the second execution operation with respect to the job identified to be the second output mode.

According to the above configuration, in the transmission output mode job to transmit the image to the external apparatus, since the confidentiality of the output material depends on output conditions of the receiving side, the confidentiality at the time of outputting is unchanged between the case of automatically transmitting the job after the approval and the case of transmitting the job by receiving the execution instruction operation. In the print output mode job to transmit the image to output the image by printing on a recording sheet, the confidentiality becomes higher in the case of printing the job by receiving the execution instruction operation than the case of automatically printing the job after the approval. Further, it may be said the transmission job is higher in confidentiality level than the printing job.

Accordingly, in the transmission job of the output mode, whose confidentiality at the time of outputting is unchanged regardless of receiving or not receiving the execution instruction operation (whose confidentiality level may be said to be higher than the print job), by automatically executing the job without receiving the execution instruction operation after the approval, an unnecessary operation can be omitted and convenience is improved. While, in the print job of the output mode, whose confidentiality becomes higher in the case of executing the job after receiving the execution instruction operation (whose confidentiality level may be said to be lower than the transmission job), by not automatically executing, but by executing the job after receiving the execution instruction operation, the security is ensured.

In case of reciting the configuration of item (2), the transmission output mode and print output mode are included in the output mode for outputting the image with different confidentiality level. In case of reciting the configuration of item (3), the transmission output mode is included in the first output mode, and print output mode is included in the second output mode.

(5) The image processing apparatus described in any one of items (1)-(3), wherein the job execution section has, as output modes for outputting the image, a storage output mode to store the image into a memory and a print output mode to output the image by printing on a recording sheet, wherein the job attribute to be a judgment factor for switching the execution operations is information identifying the output mode, and the control section switches to the first execution operation with respect to the job identified to be the storage output mode, and to the second execution operation with respect to the job identified to be the print output mode.

According to the above configuration, in the storage output mode job to store the image into the internal memory (nonvolatile internal memory device) and the like, the confidentiality between the case of automatically storing the image after receiving the approval and the case of storing the image by receiving the execution instruction operation is unchanged at the time of outputting. Further, in the storage output mode job to store the image into the external memory (nonvolatile external memory device) connected to the image processing apparatus and the like, if the external memory is managed not to be handled by anyone else, the confidentiality is similarly unchanged. On the other hand, in the print output mode job to output the image by printing on the recording sheet, the confidentiality becomes higher in the case of executing by receiving the execution instruction operation than the case of automatically executing after the approval. The confidentiality level is different between the storage job and the print job, namely, higher in the storage job compared to the print job (The confidentiality level of the print job is lower than that of the storage job).

Accordingly, in the storage job of the output mode, whose confidentiality at the time of outputting is unchanged regardless of receiving or not receiving the execution instruction operation (whose confidentiality level may be said to be higher than the print job), by automatically executing the job without receiving the execution instruction operation after the approval, an unnecessary operation can be omitted and convenience is improved.

While, in the print job of the output mode, whose confidentiality becomes higher in the case of executing the job after receiving the execution instruction operation (whose confidentiality level may be said to be lower than the transmission job), by not automatically executing, but by executing the job after receiving the execution instruction operation, the security is ensured.

In case of reciting the configuration of item (2), the transmission output mode and print output mode are included in the output mode for outputting the image with different confidentiality level. In case of reciting the configuration of item (3), the transmission output mode is included in the first output mode, and print output mode is included in the second output mode.

(6) The image processing apparatus described in any one of items (1)-(3), wherein the job execution section has, as output modes for outputting the image, a storage output mode to store the image into a memory and a print output mode to output the image by printing on a recording sheet, wherein the job attribute to be a judgment factor for switching the execution operations is information identifying the output mode, and the control section switches to the first execution operation with respect to the job identified to be the storage output mode, and to the second execution operation with respect to the job identified to be the print output mode.

(7) The image processing section described in items (5) or (6), wherein in the storage output mode, the job execution section encrypts the image and stores in the memory, and a control section, in cases where the job accepted by the job reception section is a job to output the image encrypted and stored in the memory, makes the job under an approval waiting state, and transmits an approval request notice requiring the approval of an approver for outputting the image by the job, and in cases of receiving an approval notice indicating the approval for outputting the image by the job requiring the approval, allows execution of the job, and the job execution section, in cases of executing the job to output the image encrypted and stored in the memory, decrypts and outputs the image.

Even in the case of storing the image by receiving the approval from the approver, if a user carelessly outputs the image, the image may be viewed by the third person, which is a problem in security. Further, in the case of storing the image into the external memory connected to the image processing apparatus, if the external memory is under poor management to be handled by the third person, the image stored in the external memory may be viewed by the third person, which is also a problem in security.

According to the configuration of item (7), since the image is encrypted and stored in the memory, even if the user carelessly outputs the image, or the external memory of the storage destination is improperly managed, the image cannot be viewed by the third person, thus, the security is ensured.

Further, in cases of receiving the job to output the image encrypted and stored in the memory, the apparatus makes the job under an approval waiting state, and transmits an approval request notice requiring the approval of an approver for outputting the image by the job, and in cases of receiving an approval notice indicating the approval for outputting the image by the job requiring the approval (the job of approval waiting state), allows execution of the job, and decrypts and outputs the image.

Here, the output (output mode) includes a printing, a transmission, a storage to the other memory (storage from an internal memory of the image processing apparatus to an external memory, storage from an external memory of the image processing apparatus to an internal memory, and storage from an external memory connected to the image processing apparatus to the other external memory) and the like.

Accordingly, the job to output the image stored in the memory becomes executable only in case of receiving the approval from the approver, and the careless output of the image stored in the memory by the user can be prevented from occurring.

(8) The image processing apparatus described in items (7), wherein the control section switches the execution operation with respect to the job allowed to be executed, according to the job attribute.

According to the above configuration, also in the case of executing the image stored in the memory after receiving the approval of the approver, the control section switches whether to execute the first execution operation to automatically execute or the second execution operation, according to the job attribute.

Accordingly, the start timing after the approval with respect to the job of outputting the image stored in the memory can be automatically switched appropriately in consideration of security ensuring and quick processing.

(9) The image processing apparatus described in any one of items (1)-(8), wherein with respect to the approval requiring job, in cases of receiving a selection instruction for selecting the first execution operation or the second execution operation to execute the job requiring the approval, the control section places higher priority to the selection instruction than the job attribute, and switches to the execution operation selected by the selection instruction.

According to the above configuration, with respect to the approval requiring job, in case of receiving a selection instruction for selecting the first execution operation or the second execution operation to execute the job (approval waiting job) after receiving the approval, the image processing apparatus switches to the execution operation selected by the selection instruction. Accordingly, the execution operation is enabled to be selected by each job, in the case of executing the approval waiting job after the approval.

(10) The image processing apparatus described in any one of items (1)-(9), wherein in cases of receiving a designation of the first execution operation or the second execution operation from the approver via the approval notice, the control section places the highest priority to the designation in the switching of execution operations, and switches to the execution operation instructed by the designation from the approver.

According to the above configuration, via the approval notice with respect to the approval requiring job (outputting of the image by the approval waiting job), the approver can designate whether to execute the job after the approval by the first execution operation or the second execution operation. In case of receiving an instruction of the first execution operation or the second execution operation from the approver via the approval notice, the image processing apparatus, places the highest priority to said instruction in the switching, and switches to the instructed execution operation. Accordingly, the approver is enabled to designate, by each job, the execution operation for executing the approval waiting job after the approval.

(11) The image processing apparatus described in any one of items (2)-(8), wherein in case of receiving a designation of the output mode from the approver via the approval notice, the control section changes the output mode to the designated output mode.

According to the above configuration, via the approval notice with respect to the approval requiring job (outputting of the image by the approval waiting job), the approver can designate the output mode for the job. In case of receiving the designation of the output mode from the approver via the approval notice, the image processing apparatus changes the output mode of the job to the designated output mode. Accordingly, the approver is enabled to designate, by each job, the output mode for executing the approval waiting job after the approval.

(12) The image processing apparatus described in any one of items (1)-(11), wherein at the time of executing the approval waiting job, the control section stores the job data in the approval waiting state into a second memory different from a first memory to arrange the job data at the time of executing the job.

According to the above configuration, by storing the job data in the approval waiting state into the second memory different from the first memory to arrange the job data at the time of executing the job, even in cases where the number of approval waiting job is increased, accumulation of the approval waiting job in the first memory can be prevented. In case of executing jobs not requiring the approval, by arranging the job data of the jobs in the first memory, processing can be performed with effective use of the first memory.

(13) The image processing apparatus described in any one of items (1)-(12), wherein jobs to be accepted by the job reception section include an output job of original document for outputting an image obtained by reading an original document, wherein in cases where the job accepted by the job reception section is the output job of original document and prescribed information is attached to the original document, the control section determines said job to be the job requiring the approval.

According to the above configuration, in cases where the job accepted by the job reception section is the output job of original document (for outputting an image obtained by reading an original document) and prescribed information is attached to the original document, the image processing apparatus determines said job to be the job requiring the approval. For example, with respect to the original document printed with confidential information, by previously attaching the prescribed information, the outputting of the image obtained by reading the original document is automatically set to be the job requiring the approval, thus the security for outputting the image can be ensured.

(14) An image processing method including the steps of:
accepting a job to output an image;
making the job under an approval waiting state and transmitting an approval request notice requiring the approval of an approver for outputting the image by the job, in cases where the job accepted by the job reception section is a job that requires an approval for outputting the image;
receiving an approval notice indicating the approval for outputting the image by the job requiring the approval;
switching, in cases of receiving the approval notice, whether to execute a first execution operation that automatically executes the job, or to execute a second execution operation that executes the job after receiving an execution instruction operation, according to an attribute of the job; and
executing the job and outputting the image, according to the switched execution operation.

(15) A computer-readable non-transitory storage medium stored therein a program that is executable by computer to cause the computer to perform an image processing method comprising the steps of:
accepting a job to output an image;
making the job under an approval waiting state and transmitting an approval request notice requiring the approval of an approver for outputting the image by the job, in cases where the job accepted by the job reception section is a job that requires an approval for outputting the image;
receiving an approval notice indicating the approval for outputting the image by the job requiring the approval;
switching, in cases of receiving the approval notice, whether to execute a first execution operation that automatically executes the job, or to execute a second execution operation that executes the job after receiving an execution instruction operation, according to an attribute of the job; and
executing the job and outputting the image, according to the switched execution operation.

According to the image processing apparatus or the method of the present invention, it is enabled to automatically switch the start timing, of the approval waiting job after receiving the approval, to be a proper timing in consideration of ensuring security and quick processing. Therefore, the setting operation for switching is made unnecessary, and the operation load is decreased.

The image processing apparatus relating to the present invention includes not only the MFP (multifunction peripheral) described in the embodiments, but includes the other image processing apparatuses such as copying machines, printer machines and facsimile machines.

What is claimed is:

1. An image processing apparatus comprising: a job reception section which accepts a job to output an image; a job execution section which executes the job accepted by the job reception section and outputs the image; and a control section which, in cases where the job accepted by the job reception section is a job which requires an approval for outputting the image, makes the job under an approval waiting state, and transmits an approval request notice requiring the approval of an approver for outputting the image by the job, and in cases of receiving an approval notice indicating the approval for outputting the image by the job requiring the approval, switches whether to execute a first execution operation that immediately starts the job execution automatically without receiving any user's operation after receiving the approval notice, or to execute a second execution operation that does not immediately, start the job execution after receiving the approval notice and starts to execute the job after further receiving an execution instruction operation, according to an attribute of the job, wherein the job execution section has, as output modes for outputting the image, a first output mode where a confidentiality level is unchanged between the case of executing the first execution operation after the approval and the case of executing the second execution operation, and a second output mode where the confidentiality becomes higher in the case of executing the second execution operation than the case of executing the first execution operation after the approval, and wherein the job attribute to be a judgment factor for switching the first and second execution operations is information identifying the output mode, and the control section switches to the first execution operation with respect to the job identified to be the first output mode, and to the second execution operation with respect to the job identified to be the second output mode.

2. The image processing apparatus of claim 1, wherein the job execution section has plural types of output mode including a print output mode, a transmission output mode, and a storage output mode, being different in confidentiality level with each other, for outputting the image, and wherein an additional job attribute to be a judgment factor for switching the first and second execution operations is information identifying the type of output mode.

3. The image processing apparatus described in claim 2, wherein in cases of receiving a designation of the output mode from the approver via the approval notice, the control section changes the output mode to the designated output mode.

4. The image processing apparatus of claim 1, wherein the job execution section has, as additional output modes for outputting the image, a transmission output mode to transmit the image to an external apparatus and a print output mode to output the image by printing on a recording sheet, wherein the control section switches to the first execution operation with respect to the job identified to be the transmission output mode, and to the second execution operation with respect to the job identified to be tile print output mode.

5. The image processing apparatus of claim 1, wherein the job execution section has, as additional output modes for outputting the image, a storage output mode to store the image into a memory and a print output mode to output the image by printing on a recording sheet, wherein the control section switches to the first execution operation with respect to the job identified to be the storage output mode, and to the second execution operation with respect to the job identified to be tile print output mode.

6. The image processing section of claim 5, wherein in the storage output mode, the job execution section encrypts the image and stores in the memory, and the control section, in cases where the job accepted by the job reception section is a job to output the image encrypted and stored in the memory, makes the job under an approval waiting state, and transmits an approval request notice requiring the approval of an approver for outputting the image by the job, and in cases of receiving an approval notice indicating the approval for outputting the image by the job requiring the approval, allows execution of the job, and the job execution section, in cases of executing the job to output the image encrypted and stored in the memory, decrypts and outputs the image.

7. The image processing apparatus of claim 6, wherein the control section switches the execution operation with respect to the job allowed to be executed, according to the job attribute.

8. The image processing apparatus of claim 1, wherein the job execution section has, as additional output modes for outputting the image, a transmission output mode to transmit the image to an external apparatus and a storage output mode to store the image into a memory, and a print output mode to output the image by printing on a recording sheet, wherein the control section switches to the first execution operation with respect to the job identified to be the transmission output mode or the storage output mode, and to the second execution operation with respect to the job identified to be the print output mode.

9. The image processing apparatus of claim 1, wherein with respect to the approval requiring job, in cases of receiving a selection instruction for selecting the first execution operation or the second execution operation to execute the job requiring the approval, the control section places higher priority to the selection instruction than the job attribute, and switches to the execution operation selected by the selection instruction.

10. The image processing apparatus of claim 1, wherein in cases of receiving a designation of the first execution operation or the second execution operation from the approver via the approval notice, the control section places the highest priority to the designation in the switching of execution operations, and switches to the execution operation instructed by the designation from the approver.

11. The image processing apparatus of claim 1, wherein at the time of executing the approval waiting job, the control section stores the job data in the approval waiting state into a second memory different from a first memory to arrange the job data at the time of executing the job.

12. The image processing apparatus described in claim 1, wherein jobs to be accepted by the job reception section include an output job of original document image for outputting an image obtained by reading an original document, and wherein
in cases where the job accepted by the job reception section is the output job of original document image and prescribed information is attached to the original document, the control section determines said job to be the job requiring the approval.

13. An image processing method comprising: accepting a job to output an image; making the job under an approval waiting state and transmitting an approval request notice requiring the approval of an approver for outputting the image by the job, in cases where the job accepted by the job reception section is a job that requires an approval for outputting the image; receiving an approval notice indicating the approval for outputting the image by the job requiring the approval; switching, in cases of receiving the approval notice, whether to execute a first execution operation that immediately starts the job execution automatically without receiving any user's operation after receiving the approval notice, or to execute a second execution operation that does not immediately start the job execution after receiving the approval notice and starts to execute the job after further receiving an execution instruction operation, according to an attribute of the job; and executing the job and outputting the image, according to the switched execution operation, wherein the step of executing the job and outputting the image is capable of, as plural types of output mode, a first output mode where a confidentiality level is unchanged between the case of executing the first execution operation automatically executing the approval waiting job after the approval and the case of executing the second execution operation, and a second output mode where the confidentiality becomes higher in the case of executing the second execution operation than the case of executing the first execution operation after the approval, wherein the job attribute to be a judgment factor for switching the first or second operations is information identifying the output mode, and the switching step switches to the first execution operation with respect to the job identified to be the first output mode, and to the second execution operation with respect to the job identified to be the second output mode.

14. The image processing method of claim 13, wherein the step of executing the job and outputting the image is capable of plural types of output mode including a print output mode, a transmission output mode, and a storage output mode, being different in confidentiality level with each other, for outputting the image, and wherein an additional job attribute to be a judgment factor for switching the first and second execution operations is information identifying the type of output mode.

15. The image processing method of claim 13, wherein the step of executing the job and outputting the image is capable of, as additional output modes, a transmission output mode to transmit the image to an external apparatus and a print output mode to output the image by printing on a recording sheet, wherein the switching step switches to the first execution operation with respect to the job identified to be the transmission output mode, and to the second execution operation with respect to the job identified to be the print output mode.

16. A computer-readable non-transitory storage medium stored therein a program that is executable by computer to cause the computer to perform an image processing method comprising the steps of: accepting a job to output an image; making the job under an approval waiting state and transmitting an approval request notice requiring the approval of an approver for outputting the image by the job, in cases where the job accepted by the job reception section is a job that requires an approval for outputting the image; receiving an approval notice indicating the approval for outputting the image by the job requiring the approval; switching, in cases of receiving the approval notice, whether to execute a first execution operation that immediately starts the job execution automatically without receiving any user's operation after receiving the approval notice, or to execute a second execution operation that does not immediately start the job execution after receiving the approval notice and starts to execute the job after further receiving an execution instruction operation, according to an attribute of the job; and executing the Iob and outputting the image, according to the switched execution operation, wherein the step of executing the job and outputting the image is capable of, as plural types of output mode, a first output mode where a confidentiality level is unchanged between the case of executing the first execution operation after the approval and the case of executing the second execution operation, and a second output mode where the confidentiality becomes higher in the case of executing the second execution operation than the case of executing the first execution operation after the approval, wherein the job attribute to be a judgment factor for switching the first and second execution operations is information identifying the output mode, and the switching step switches to the first execution operation with respect to the job identified to be the first output mode, and to the second execution operation with respect to the job identified to be the second output mode.

17. The computer-readable non-transitory storage medium of claim 16, wherein the step of executing the job and outputting the image is capable of plural types of output mode including a print output mode, transmission output mode and a storage output mode, being different in confidentiality level with each other, for outputting the image, and wherein an additional job attribute to be a judgment factor for switching the first and second execution operations is information identifying the type of output mode.

18. The computer-readable non-transitory storage medium of claim 16, wherein the step of executing the job and outputting the image is capable of, as additional output modes, a transmission output mode to transmit the image to an external apparatus and a print output mode to output the image by printing on a recording sheet, wherein the switching step switches to the first execution operation with respect to the job identified to be the transmission output mode, and to the second execution operation with respect to the job identified to be the print output mode.

* * * * *